US009632583B2

(12) United States Patent
Virtanen et al.

(10) Patent No.: US 9,632,583 B2
(45) Date of Patent: Apr. 25, 2017

(54) CONTROLLING OUTPUT CURRENT FOR ELECTROSENSORY VIBRATION

(71) Applicant: Senseg Ltd., Espoo (FI)

(72) Inventors: Juha Virtanen, Helsinki (FI); Lauri Aarnio, Helsinki (FI)

(73) Assignee: Senseg Ltd., Espoo (FI)

( * ) Notice: Subject to any disclaimer, the term of this patent is extended or adjusted under 35 U.S.C. 154(b) by 178 days.

(21) Appl. No.: 14/602,058

(22) Filed: Jan. 21, 2015

(65) Prior Publication Data

US 2015/0205357 A1 Jul. 23, 2015

Related U.S. Application Data

(60) Provisional application No. 61/929,899, filed on Jan. 21, 2014.

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
USPC ..................................................... 340/407.2
See application file for complete search history.

(56) References Cited

U.S. PATENT DOCUMENTS

| | | | | | |
|---|---|---|---|---|---|
| 3,621,286 | A | * | 11/1971 | Varrasso | G11C 27/024 315/84.51 |
| 3,621,471 | A | * | 11/1971 | Dick | H03C 3/24 327/432 |
| 3,641,514 | A | * | 2/1972 | Rees | G11C 27/00 365/182 |
| 5,053,757 | A | * | 10/1991 | Meadows | G06F 3/044 341/22 |
| 6,141,232 | A | | 10/2000 | Weinmeier et al. | |
| 2005/0182456 | A1 | * | 8/2005 | Ziobro | A61B 5/0488 607/48 |
| 2007/0129716 | A1 | * | 6/2007 | Daw | A61B 18/1206 606/34 |
| 2007/0216657 | A1 | * | 9/2007 | Konicek | G06F 3/0412 345/173 |
| 2008/0015657 | A1 | * | 1/2008 | Haefner | A61N 1/056 607/62 |

(Continued)

*Primary Examiner* — Fekadeselassie Girma
(74) *Attorney, Agent, or Firm* — Schwegman, Lundberg & Woessner, P.A.

(57) ABSTRACT

In electrosensory vibration technology, a potential difference is formed between a touched surface of a device and a body member of a user, creating an attractive force between the two. To meet industry safety standards, the capability of a corresponding voltage source to drive electrical current may be kept low, and the maximum slew rate with such a voltage source would be accordingly limited. However, such a limit on the slew rate may result in softer haptic effects or lower repetition rates of haptic effects, and the ability of such a device to express a wide range of haptic effects may be reduced compared to a device capable of driving the external load with the maximum current allowed by applicable standards. As a technical means to solve this technical problem, it may be helpful to use a powerful voltage source with a controller to control the outgoing current.

20 Claims, 15 Drawing Sheets

(56) References Cited

U.S. PATENT DOCUMENTS

2011/0298539 A1\* 12/2011 Drogi .................... H03F 1/0227
       330/129
2013/0169340 A1\* 7/2013 Tao ....................... G06F 3/0416
       327/336

\* cited by examiner ously applied to the touched surface, the friction force felt by the user is modulated, which may create an illusion of texture on an otherwise smooth surface.

CONTROLLING OUTPUT CURRENT FOR ELECTROSENSORY VIBRATION

RELATED APPLICATION

This application claims the priority benefit of U.S. Provisional Patent Application No. 61/929,899, filed Jan. 21, 2014, which is incorporated herein by reference in its entirety.

TECHNICAL FIELD

The subject matter disclosed herein generally relates to machines that are configured to facilitate electrosensory vibration, which may also be called electrostatic vibration or electrovibration, including devices configured to provide, via electrosensory vibration, various tactile effects that do not involve mechanical actuation. Specifically, the present disclosure addresses systems (e.g., apparatus) and methods to facilitate measurement and control (e.g., management) of current flowing from such a device to a user.

BACKGROUND

A device, such as a portable device or a fixed device, may include one or more touchscreens. A touchscreen of a device may be configured to display visual information to a user of the device, as well as to detect one or more locations at which one or more body members (e.g., fingertips) of the user makes physical contact with (e.g., touches) the touchscreen.

BRIEF DESCRIPTION OF THE DRAWINGS

Some embodiments are illustrated by way of example and not limitation in the figures of the accompanying drawings.

DETAILED DESCRIPTION

Example methods and systems are directed to controlling output current, for example, in an electrosensory vibration driver (e.g., an electrostatic vibration driver). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In electrosensory vibration technology, a quasi-static potential difference is formed between a touched surface and a body member of the user (e.g., the user's finger). This electrical field creates an attractive surface-perpendicular Coulomb force between the touched surface and the body member. While this Coulomb force might be too small to be perceived by the user as such, the Coulomb force enables modulation of the surface-parallel friction force on the body member, as well as modulation of other lateral forces when the user slides the body member on the touched surface. When suitably timed, such alterations to one or more lateral forces on the body member are clearly perceivable by the user and, when combined with matching graphics, may provide a basis for a strong tactile perception of textures and objects on the touched surface. Where the touched surface is a touchscreen, this electrosensory vibration technology enables the user to tactilely perceive one or more textures, objects, or both, shown on the touchscreen.

Figure 1:
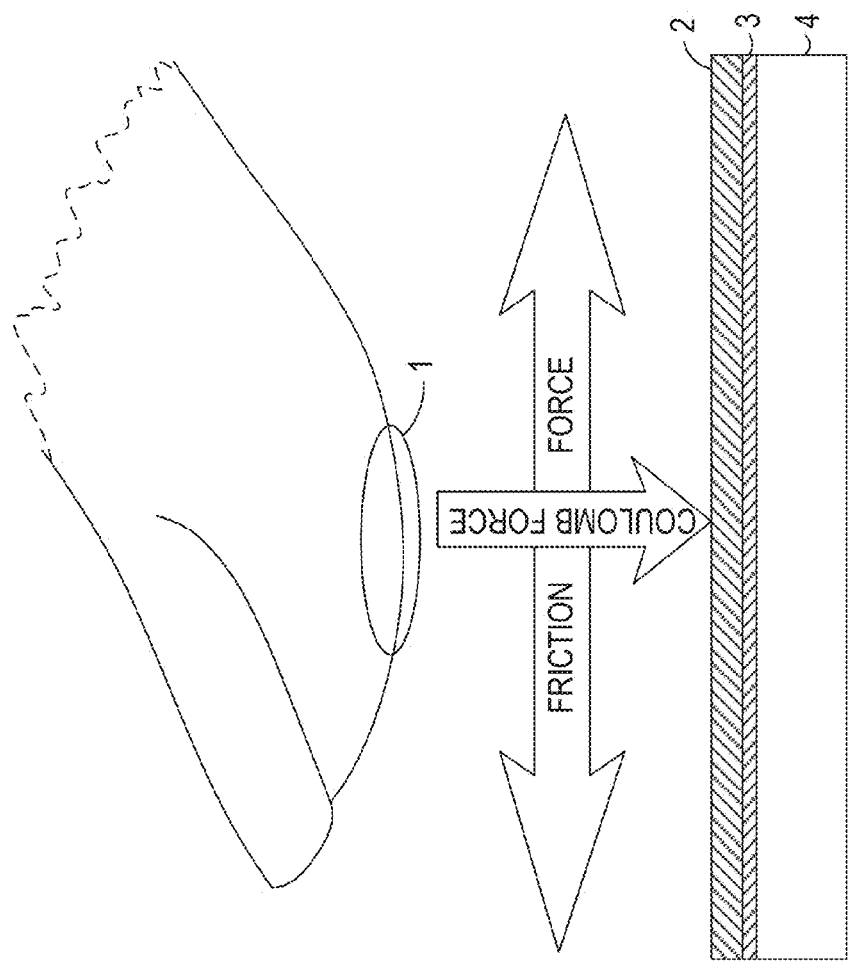
FIG. 1 is a conceptual diagram illustrating general concepts of electrosensory vibration technology, according to some example embodiments.

FIG. 1 illustrates some general concepts of electrosensory vibration technology that may be used, for example, in providing tactile stimulation. Such tactile stimulation may include one or more haptic effects, which may be chosen according to the desired perception. As shown in FIG. 1, a uniform conductive layer 3 and a thin insulative layer 2 are arranged on the top of a surface 4, and this layered structure is configured to be touched by a body member of a user, which is shown in the example form of a fingertip. Electrical charge is brought to the conductive layer 3 (e.g., a conductor or an electrode), while the insulative layer 2 (e.g., an insulator) prevents it discharging to the user's finger. The combination of the conductive layer 3 and insulative layer 2 may be referred to as a "Tixel" layer. The Tixel layer and the finger of the user form a capacitor (e.g., via capacitive coupling), which is charged and discharged according to the haptic effect desired. Area 1 in FIG. 1 represents an area on the tip of the user's finger, where electrical charges induced by the conductive layer 3 are accumulated.

As a result of the electrical charges brought to the conductive layer 3 and accumulated in the area 1 of the fingertip, an electrical field is created between the conductive layer 3 and the fingertip. This electric field has a potential V (e.g., a difference in electrical potential) and creates an attractive Coulomb force between the fingertip and the conductive layer 3. The Coulomb force acts perpendicular to the surface 4, the conductive layer 3, and the insulative layer 2, and one or more friction forces on the fingertip act parallel to the surface 4, the conductive layer 3, and insulative layer 2. Since such a friction force may depend, at least in part, on the amount of force that is normal to the insulative layer 2, the friction force may vary according to (e.g., proportionally with) variations in the Coulomb force, which may be controlled by varying the electrical charge of the conductive layer 3.

Figure 2:
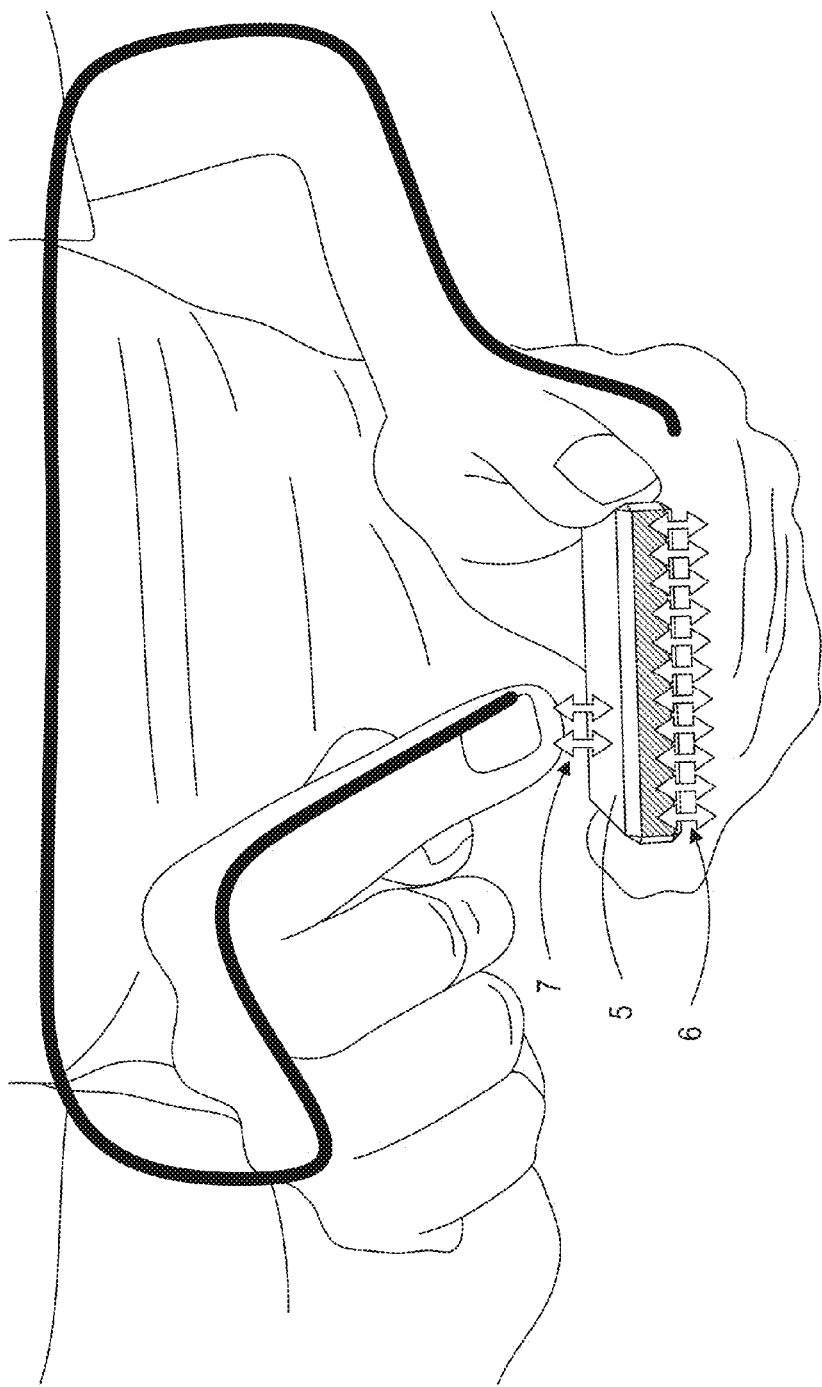
FIG. 2 is a conceptual diagram illustrating, at a system level, how a difference in electrical potential can be induced between a user's finger and a Tixel layer, according to some example embodiments.

FIG. 2 illustrates a system (e.g., an apparatus) in which a difference in electrical potential can be induced between a finger and a Tixel layer. A Tixel layer (e.g., a structure with conductive and insulative elements) may lie on or otherwise be incorporated into a touchscreen of a mobile device 5 (e.g., a smart phone or tablet computer) and be driven to a high electrical potential V, compared to a reference potential of the mobile device 5. When the user holds the mobile device 5 in a supporting hand (e.g., left hand), the reference potential of the mobile device 5 is coupled to the supporting hand, as illustrated in FIG. 2 by arrows 6. Because the human body is conductive, the potential of a fingertip (e.g., of the user's right hand) operating the touchscreen is the same as, or close to, the reference potential of the mobile device 5. Hence, a large potential difference V, illustrated in FIG. 2 by arrows 7, may be generated between the Tixel layer and the user's fingertip. Although the mobile device 5 is illustrated in FIG. 2 as a handheld device, examples of the mobile device 5 may include any touchable device, such as a desktop computer, a vehicle computer, a tablet computer, a navigational device, a portable media device, a smartphone, or a wearable device (e.g., a smart watch or smart glasses).

Figure 3:
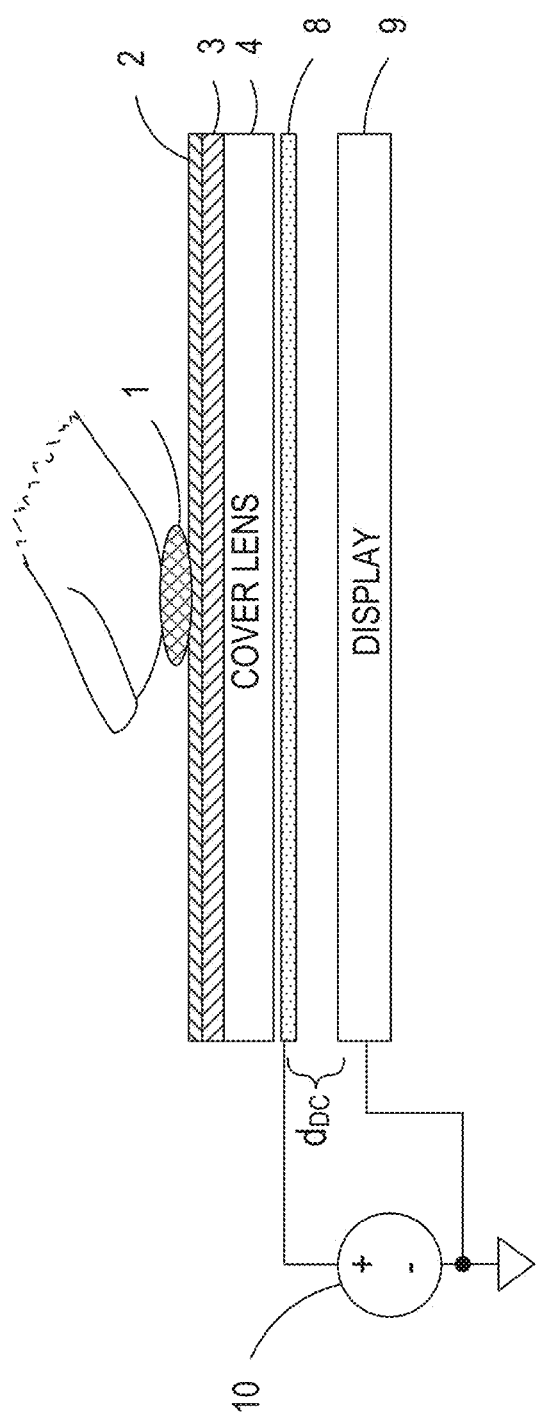
FIG. 3 is a block diagram illustrating inner structures of a device, according to some example embodiments.

FIG. 3 shows inner structures (e.g., layers, such as a Tixel layer) of a device (e.g., a haptic device or haptified device), such as the mobile device 5 discussed above with respect to FIG. 2. Charge coupling to a Tixel layer (e.g., composed of the insulative layer 2 and the conductive layer 3) may be performed capacitively through the surface 4, which may take the example form of a cover lens. Accordingly, a voltage source 10 may electrically charge an electrode 8 on the inner surface of the surface 4 (e.g., the cover lens) to an electrical potential V (e.g., $d_{DC}$, as shown in FIG. 3) with respect to the reference electrical potential of the device. In FIG. 3, a display 9 of the device (e.g., a touchscreen of the device) has the reference electrical potential of the device. As used herein, the reference electrical potential of a device may be referred to as the "device reference" for that device. The conductive layer 3 may be capacitively charged by the electrode 8 being charged to the electrical potential V (e.g., $d_{DC}$) relative to the device reference, and the area 1 of the depicted fingertip may be accordingly charged as described above with respect to FIG. 1.

Figure 4:
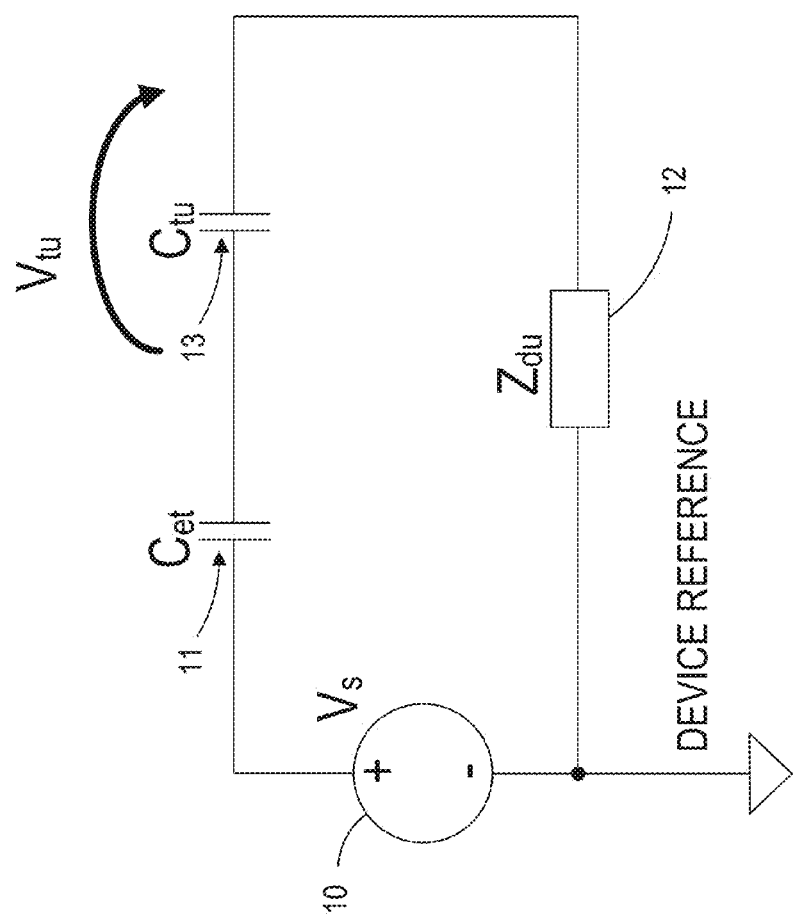
FIG. 4 is a circuit diagram illustrating an equivalent circuit for the device, according to some example embodiments.

FIG. 4 shows an equivalent circuit for the device (e.g., mobile device 5) discussed above with respect to FIG. 3. As used herein, the phrase "haptic effect pulse" refers to a voltage waveform (e.g., including one or more frequencies) for generating a desired haptic effect (e.g., via one or more Tixel layers). Generation of a haptic effect may start with the voltage source 10 driving a high-voltage haptic effect pulse between the device reference (e.g., at the display 9) and the electrode 8. This may result in creation of a strong capacitive coupling $C_{et}$ between the electrode 8 and the Tixel layer. FIG. 4 illustrates this capacitive coupling $C_{et}$ as a capacitor 11. A user of the device may be electrically coupled to the device reference (e.g., chassis ground of the device) with a contact impedance $Z_{du}$. FIG. 4 illustrates this contact impedance $Z_{du}$ with a resistor 12. When the user touches the Tixel layer (e.g., the insulative layer 2 within the textile layer) with a finger, another capacitive coupling $C_{tu}$ arises between the Tixel layer and the user. FIG. 4 illustrates this capacitive coupling $C_{tu}$ as another capacitor 13. As shown, this capacitive coupling $C_{tu}$ is charged to voltage $V_{tu}$, which may normally be close to the voltage $V_S$ driven by the voltage source 10.

The difference in electrical potential between the Tixel layer and the user's finger generates an attractive Coulomb force between the two. In the example embodiments shown in FIG. 4, $V_{tu}$ depends not only on the signal voltage $V_S$, but also on the values of $C_{et}$, $C_{tu}$, and $Z_{du}$. According to various example embodiments, $C_{tu}$ is typically less than 100 pF for a single fingertip. Furthermore, if the user touches the Tixel layer with a whole hand (e.g., right hand or left hand), $C_{tu}$ may be as large as 2 nF. $C_{et}$ may typically be much larger than $C_{tu}$. In various example embodiments, $V_S$ is a unipolar or bipolar signal with an amplitude from a few hundreds of volts up to a few kilovolts (e.g., 100 V, 500 V, 1 kV, or 2 kV). The waveform of a haptic effect pulse may vary depending on the desired electrosensory effect to be perceived by the user. A typical haptic effect includes a set (e.g., a sequence or a train) of one or more haptic effect pulses. The duration of a single haptic effect pulse may vary between 0.1 and 50 ms.

Figure 5:
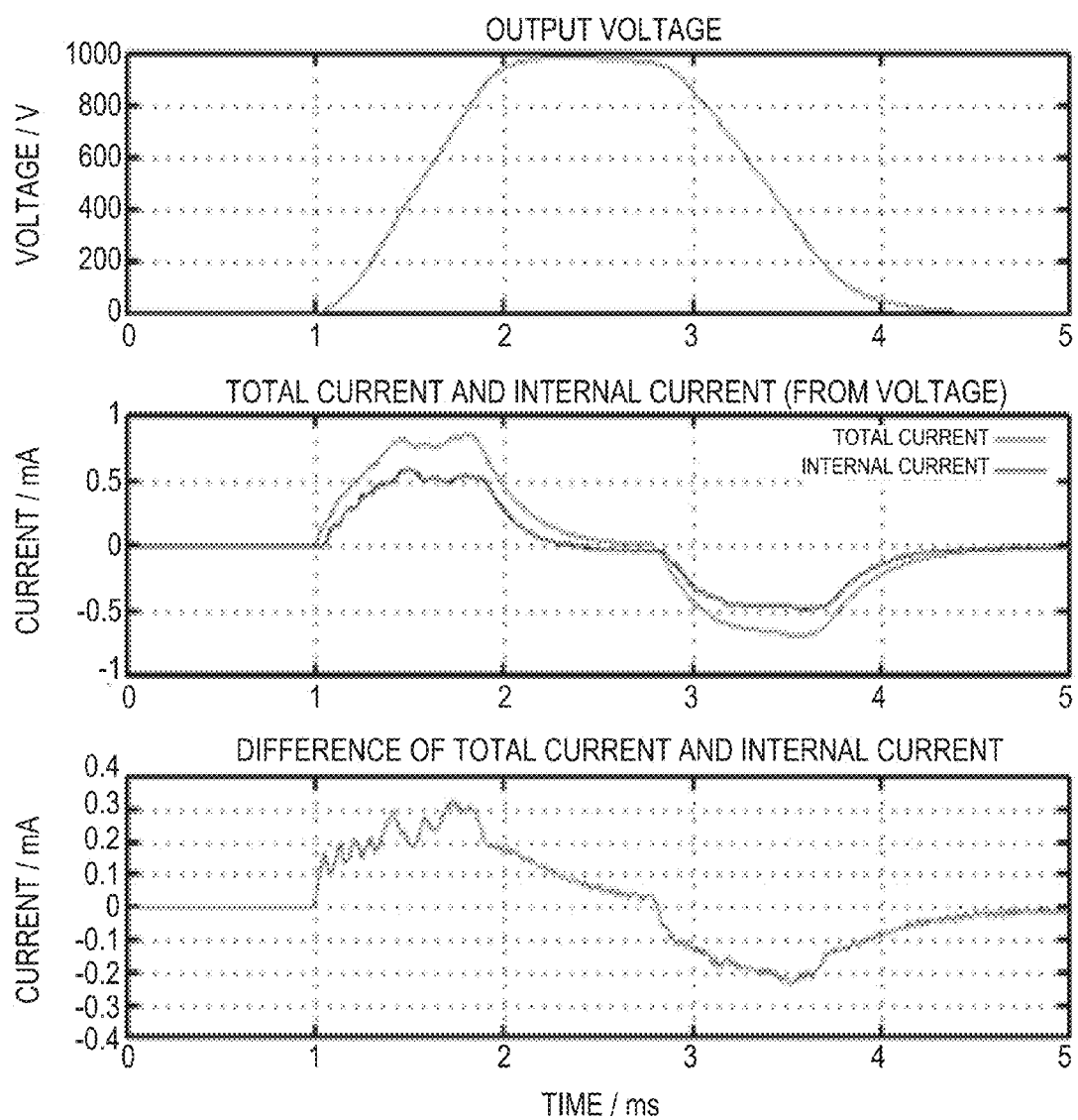
FIG. 5 is a set of graphs illustrating a haptic effect pulse, according to some example embodiments.

FIG. 5 illustrates an example of a single haptic effect pulse and its associated electrical currents. The upper panel of FIG. 5 shows the waveform of the high-voltage signal (e.g., driven by the voltage source 10). The middle panel of FIG. 5 shows total current $I_{TOT}$ (as a light grey line) and internal current $I_{INT}$ (as a dark grey line). In the example embodiments illustrated in FIG. 5, the external load may be formed by two fingers (e.g., two fingertips) touching a Tixel layer. The lowest panel of FIG. 5 shows the difference between the total current $I_{TOT}$ and the internal current $I_{INT}$. As shown, the peak value of the difference signal $I_{EXT}$ is approximately 300 µA.

Figure 6:
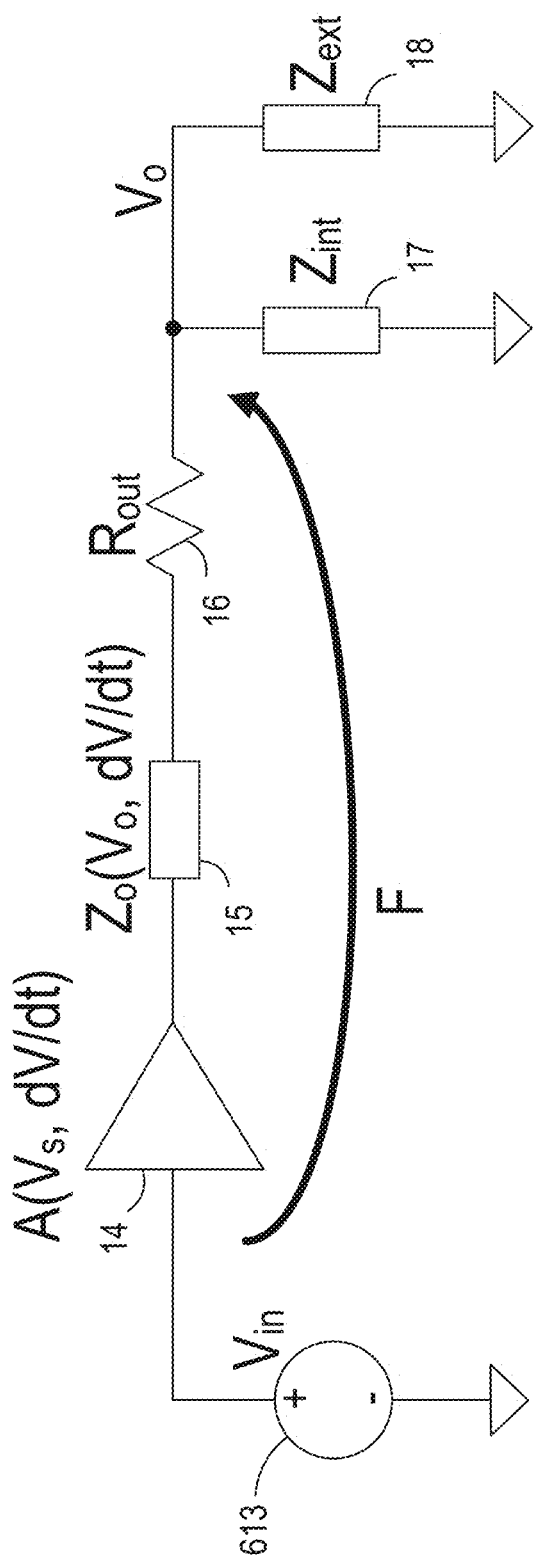
FIG. 6 is a circuit diagram illustrating an equivalent circuit for a voltage source and its electrical load, according to some example embodiments.

FIG. 6 shows an equivalent circuit for the voltage source 10 and its electrical load (e.g., formed by one or more body members touching a Tixel layer). Generally, the voltage source 10 can be seen as an amplifier 14 with complex output impedance Z. This output impedance is shown in FIG. 6 as a resistor 15. The amplifier 14 is controlled by an input signal 613 with varying voltage $V_{IN}$, and the electrical load includes (e.g., consists of) an internal impedance $Z_{int}$ and an external load $Z_{ext}$. The internal impedance $Z_{int}$ is represented in FIG. 6 as a resistor 17, and the external load $Z_{ext}$ is represented in FIG. 6 as another resistor 18. The gain $A(V_O, dV/dt)$ of the amplifier 14 may be a function of the level of the output voltage $V_O$ and the rate-of-change of the output voltage $V_O$. Similarly, the output impedance $Z_O(V_O, dV/dt)$ of the amplifier 14 may be a function of the level and the rate-of-change of the output voltage $V_O$.

Figure 7:
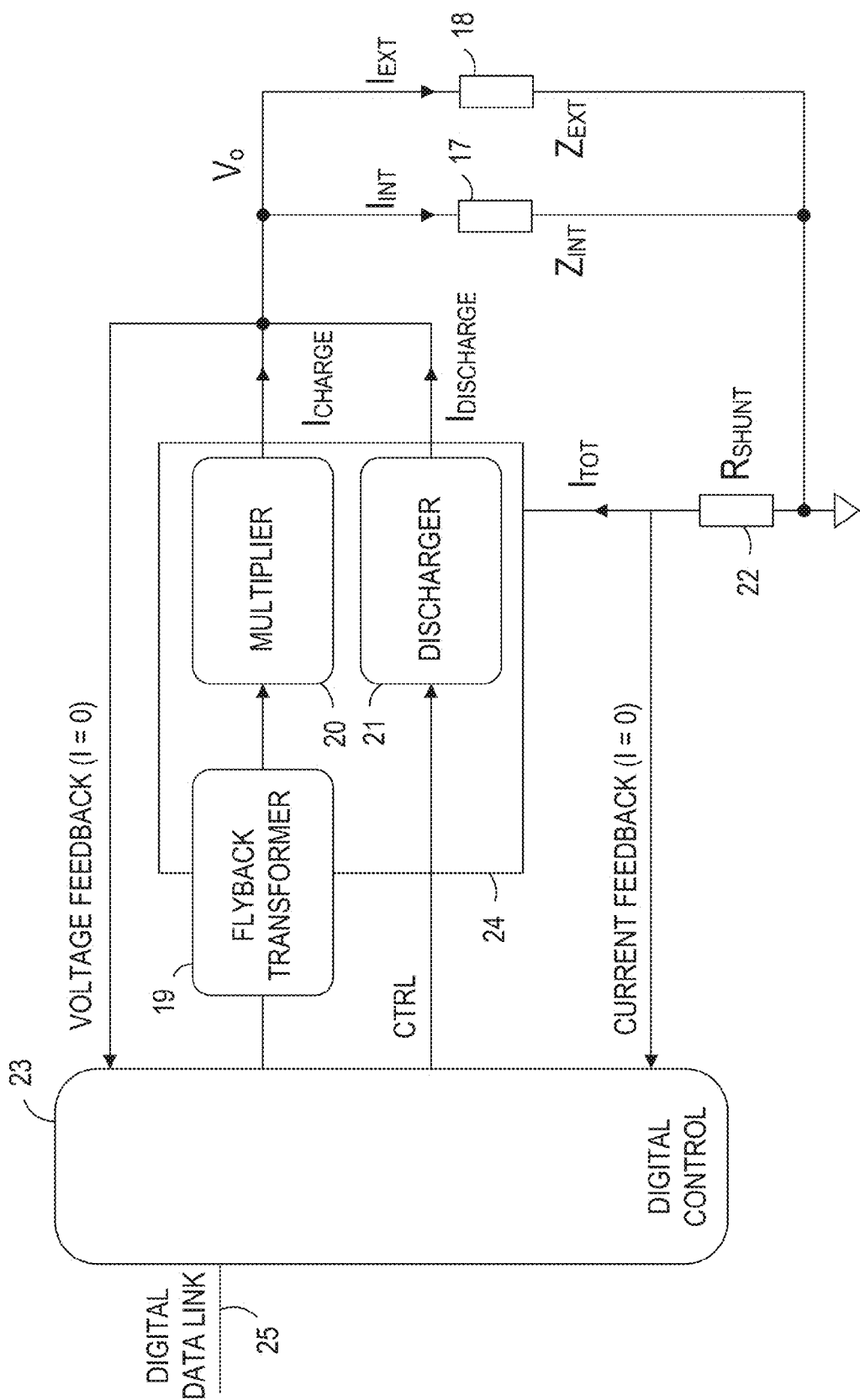
FIG. 7 is a block diagram illustrating a voltage source, according to some example embodiments.

Referring briefly to FIG. 7, a practical implementation of the voltage source 10 may include one or more pulse-controlled flyback transformers 19, one or more multipliers 20 (e.g., a voltage multiplier), and one or more dischargers 21 (e.g., a discharge transistor). The combination of a flyback transformer and a multiplier may be referred to as a "charger" circuit. Moreover, this implementation of the voltage source 10 may include a digital control 23 (e.g., a digital controller or a digital control block), which may be configured to receive the input signal in digital format from a host device. However, for the purposes of clarity in describing certain example embodiments herein, the voltage source 10 may be represented as an amplifier (e.g., amplifier 14) controlled by an analog input signal (e.g., input signal 613).

Referring back to FIG. 6, the electric load to be supplied by the voltage source 10 is illustrated as including (e.g., consisting of) the resistors 17 and 18, with respective impedances $Z_{INT}$ and $Z_{EXT}$. In many example embodiments, the internal load is purely capacitive, and $Z_{INT}$ may accordingly be reduced to $C_{INT}$. As discussed above with respect to FIG. 3, $C_{INT}$ is the capacitance between device reference (e.g., chassis ground, as represented by the display 9) and the charged electrode 8. The value of $C_{INT}$ may be less than 1 nF. In certain example embodiments, the user couples to the device capacitively through the surface of the Tixel layer. In such a situation, the complex external load $Z_{EXT}$ may accordingly be reduced to its capacitive component $C_{EXT}$. The value of this coupling capacitance $C_{EXT}$ may be small compared to $C_{INT}$.

FIG. 7 shows one example embodiment of the voltage source 10. The digital control 23 is configured to receive one or more haptic effect requests from a host system (e.g., a processor within the mobile device 5) through a digital data link 25 and accordingly generate one or more high-voltage signals (e.g., an arbitrary high-voltage signal waveform, such as $V_S$, as shown in FIG. 4). Such a high-voltage signal may be generated directly from device battery voltage, for example, using a combination of the flyback transformer 19 and the multiplier 20. A separate discharger 21 may be used for reducing the voltage of the mainly capacitive load $Z_{INT}$ in parallel with $Z_{EXT}$.

The flyback transformer 19 may be configured to generate one or more voltage pulses, for example, with peak voltage of about 350 V. The digital control 23 may include a sophisticated controller (e.g., a flyback controller) and a power transistor for switching the primary current of the flyback transformer 19. The flyback frequency may vary between 300 kHz and 600 kHz.

The multiplier 20 may be configured to provide output voltages higher than the peak voltage of the flyback transformer 19. In some example embodiments, the multiplier 20 is implemented as a Cockcroft-Walton generator. The multiplier 20 is configured to produce a cumulative high-voltage output $V_O$ from a pulsed input. According to certain example embodiments, the multiplier 20 does not have any controls of its own but may be active whenever driven by a previous stage (e.g., flyback transformer 19). The desired maximum output voltage may determine or otherwise influence the number of stages in the multiplier 20. Depending on the desired output voltage, a single rectifier diode may replace the multiplier 20. According to various example embodiments, maximum output voltage values may range between 1 kV and 2 kV.

Once the mainly capacitive load $Z_{INT}$ in parallel with $Z_{EXT}$ has been charged to a certain voltage, the capacitance maintains that level of voltage. In order to generate one or more of various arbitrary signal waveforms, the load may be fully or partially discharged in a controlled way. The discharger 21 may be or include a set of N-FETs, in series, that draws a constant current $I_{DISCHARGE}$ from the load when in an "on" state, according to certain example embodiments.

The digital control 23 may also be configured to monitor the output voltage $V_O$ continuously. As shown in FIG. 7, a voltage feedback signal may be used for controlling generation of the high-voltage waveform. The flyback transformer 19 and the discharger 21 may accordingly be controlled in real time based on this voltage feedback signal.

In discussing parameters for output current control, the international standard IEC 60950-1 (second edition, December 2005) may be used as a reference on electrical safety. Other relevant standards may have slightly different numerical values, but their parameters are generally similar to IEC 60950-1. In IEC 60950-1 voltages below 42.4 V peak or 60 V DC are considered as inherently safe. Because the voltages in the voltage source 10 exceed these limits, the devices and circuitry discussed above may follow the parameters specified by IEC 60950-1 for a "limited current circuit." These parameters may be summarized as follows:

1. Steady-state current patterns shall remain below 0.7 mA peak, as measured through the test circuit specified as "D.1 Measuring instrument".
2. Direct current shall remain below 2 mA.
3. Non-repeating search currents shall supply less than 45 µC of charge.

Figure 8:
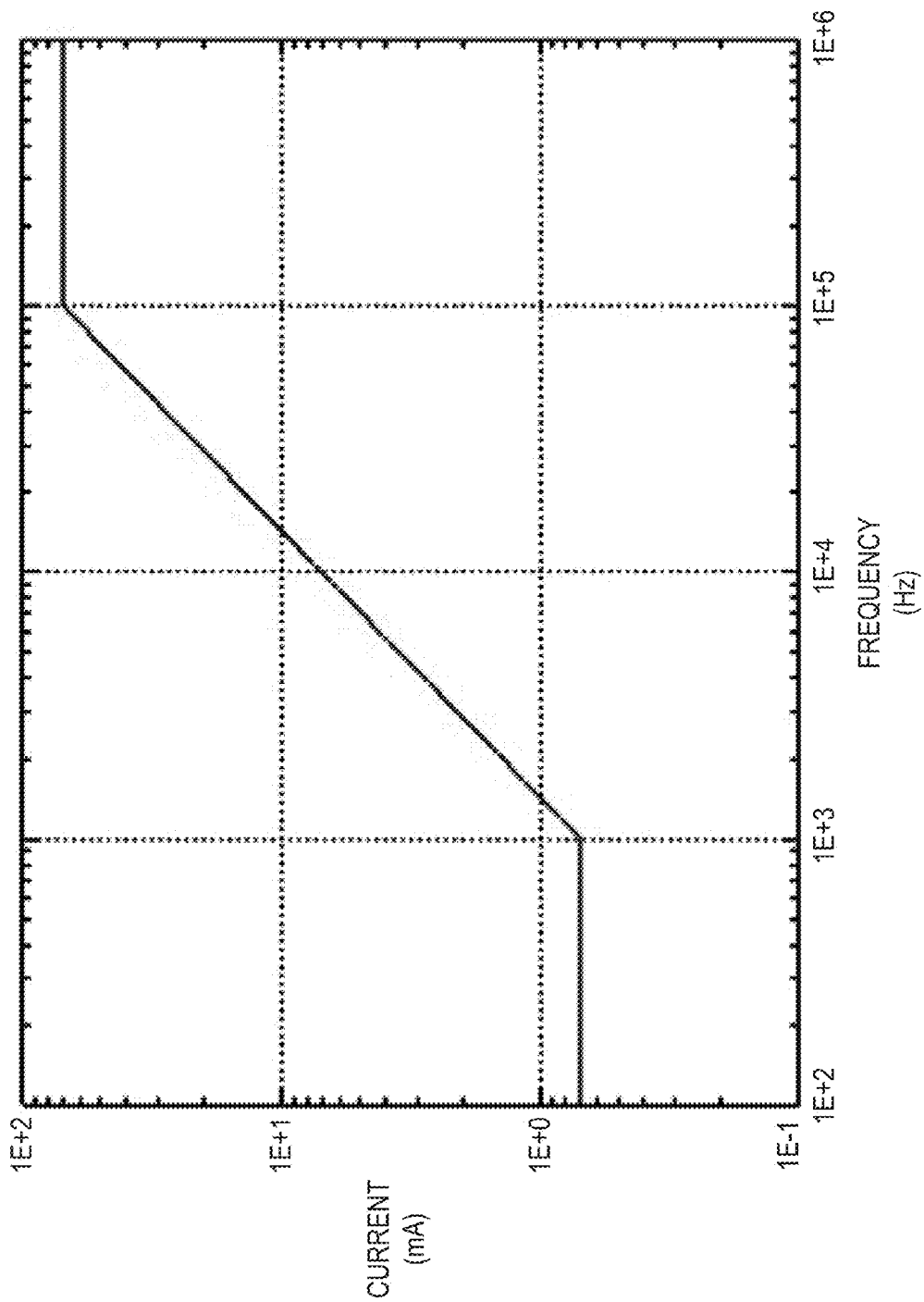
FIG. 8 is a graph illustrating a frequency dependency among values for maximum output current, according to some example embodiments.

FIG. 8 illustrates values for maximum output current, with a frequency dependence implemented by the D.1 Measuring instrument described in the standard. The lower time constant of the frequency response corresponds to a time constant of about 220 µs. The test circuit shows 2 kΩ input impedance at low frequencies. The above-summarized parameters may be applied to both normal operation and to single-fault conditions. Accordingly, at least under normal conditions, the user does not directly touch any high-voltage parts of end products constructed according to these parameters.

In normal use, the external load is capacitive, and it is therefore possible to replace $Z_{EXT}$ (represented in FIGS. 6 and 7 by the resistor 18) with $C_{EXT}$. For example if $C_{EXT}$=330 pF and $dV_O/dt$=2 kV/ms, then the output current $I_{EXT}=C_{EXT} \times dV_O/dt$=0.66 mA. Under a single-fault condition in which the user touches the high-voltage output $V_O$ directly, the voltage source 10 may supply a current of only 4 mA DC, for example, if the impedance $Z_{EXT}$ of the external load is in the kilo-ohm range.

The above-summarized parameters may also be applied to the current $I_{EXT}$ flowing out of the device (e.g., mobile device 5), inside which the voltage source 10 resides. The standard does not set limits for the internal current $I_{INT}$ flowing through device internal load $Z_{INT}$.

A straightforward way to meet the above-summarized parameters is to reduce the current drive capability of the voltage source 10, such that the total current never exceeds the 0.7 mA specified in the standard. In normal use, the capacitive load is mostly due to the internal load $Z_{INT}$ with a minor contribution from the external capacitance $C_{EXT}$. Accordingly, the maximum slew rate with a current-limited voltage source (e.g., voltage source 10) would be only a fraction of the maximum allowed by the standard. This may be problematic, at least because a reduced slew rate may result in softer haptic effects, lower repetition rates of haptic effect pulses, or both.

Thus, though it is possible to produce tangible (e.g., feelable) haptic effects using a current-limited voltage source (e.g., voltage source 10), as described above, the ability of such a system to express a wide range of haptic effects is significantly reduced compared to a system capable of driving the external load with the maximum current allowed by the standard. As a technical means to solve this technical problem, it may be helpful to use a powerful voltage source 10, combined with a component (e.g., a controller) configured to control the outgoing current $I_{EXT}$.

Accordingly, a device (e.g., mobile device 5) may include a voltage source (e.g., voltage source 10), which may be capable of charging a load capacitance $Z_{INT}=C_{INT}$=500 pF at a slew rate of about 2 kV/ms. If the capacitance $C_{EXT}$ of a user's fingertip is small, at such a slew rate, the voltage source may draw only a small current (e.g., less than 200 µA). If the finger load $C_{EXT}$ becomes significant compared to $C_{INT}$, the finger current $I_{EXT}$ grows larger. For example, with a multi-finger touch, $I_{EXT}$ may exceed the 0.7 mA limit specified in the standard. Furthermore, in the case of a single-fault condition in which the user touches a high-voltage component (e.g., a high-voltage rail) directly, the current may be several milliamperes. Although the slew rate of the output voltage may decrease to some extent due to the heavier external load, this decrease may be small enough to keep the current below the relevant limits (e.g., as specified in the standard).

The waveforms of various haptic effect pulses may have different shapes and amplitudes depending on the intended tactile sensation (e.g., electrosensory vibration) to be perceived by the user. In addition to a pulse-specific amplitude, an overall amplitude setting may be variable and may be set according to the user's preferences. If the impedance of the external load is low enough, even small haptic effect pulses may generate excessive current peaks. Furthermore, in order to fully utilize the permissible range of current, as specified by the standard, the frequency content of the current peaks may be analyzed against the frequency dependence defined in IEC 60950-1 (e.g., as shown in FIG. 8). Hence, if control of the current were to be based solely on a predefined threshold value, such a solution would not perform very well in enabling the expression of a wide range of haptic effects. Instead, a method of estimating the external current should take into account one or more (e.g., all) of the aspects mentioned above.

According to systems and methods discussed herein, suitable control of output current may be performed by first obtaining (e.g., creating, generating, calculating, or otherwise determining) an estimate of the external load impedance $Z_{EXT}$, and adjusting the input signal $V_{IN}$ based on this estimated $Z_{EXT}$, such that a predefined current limit (e.g., adopted from IEC 60950-1) is not exceeded. Load impedance estimation may be performed without an explicit current measurement circuit. In some situations, only one high-voltage measurement is sufficient, and an example of such a topology is illustrated in FIG. 6. Referring to FIG. 6, if the external impedance $Z_{EXT}$ is infinite or assumed to be infinite, the transfer voltage function F between the input voltage $V_{IN}$ and the output voltage $V_O$ is known. The transfer function F includes the effect of the internal load impedance $Z_{INT}$. As the additional external load $Z_{EXT}$ changes the output voltage $V_O$, it is possible to calculate the value of $Z_{EXT}$ based on its effect on the transfer function F. In some example embodiments, the open-loop gain $A(V_O, dV/dt)$ and open-loop output impedance $Z_O(V_O, dV/dt)$ of the voltage source circuit are used as shown in FIG. 6. In certain example embodiments, such as those shown in FIG. 9, the open-loop gain $A(V_O, dV/dt)$ and the open-loop output impedance $Z_O(V_O, dV/dt)$ may be encapsulated inside a feedback loop, such that the output impedance $Z_{EXT}$ of the circuit is effectively determined by a resistor 16 with resistance $R_{OUT}$.

Estimation of the external load impedance $Z_{EXT}$ may be performed during a normal haptic effect pulse. However, if the input signal $V_{IN}$ is complex in shape, it may be difficult to compute the external load impedance based on the waveform of the actual output signal $V_O$. For example, this may be the case where the estimation of the external load impedance $Z_{EXT}$ is performed by running the voltage source 10 in open-loop mode and measuring only the output voltage $V_O$, as shown in FIG. 6. One solution is to use one or more low-amplitude pilot pulses for the measurement of the external load impedance. Such a pilot pulse may have a waveform with a well-defined shape that facilitates both computation of the estimate and calibration of the system (e.g., mobile device 5) by reducing the number of parameters to be considered. It may be beneficial to keep the amplitude of the pilot pulses low, such that they do not exceed the threshold of perception (e.g., for the user of the mobile device 5).

A good way to apply pilot pulses is to perform the estimation of the external load impedance prior to each haptic effect pulse. This allows the amplitude and slew rate of the effect pulse to be computed beforehand based on the estimate of the external load impedance.

In situations where the voltage source 10 is implemented using the flyback transformer 19 (e.g., flyback converter) and the multiplier 20 (e.g., a voltage multiplier), discussed above with respect to FIG. 7, the estimation of the external load impedance $Z_{EXT}$ may be implemented, for example, by the digital control 23 (e.g., a controller) executing a predefined number of flyback cycles (e.g., only one cycle or a few cycles). The output voltage $V_O$ rises rapidly to a certain level and starts to discharge slowly towards zero. The peak value of the output voltage $V_O$ depends on the total load impedance, meaning the internal load impedance $Z_{INT}$ and the external load impedance $Z_{EXT}$ in parallel.

More generally, information about the input power drawn by the voltage source 10 may be used for estimating the magnitude of the total load impedance seen by the amplifier 14. If a current-controlled switching power supply is used, the energy per unit of time may be calculated from a count of cycles of the power switch. If the pulse current of the power supply is not constant, one or more measurement circuits may be added for measuring the supply voltage and current. For example, a current monitor may measure a filtered current signal and provide the corresponding DC or RMS value. As another example, the current monitor may measure the actual current peaks drawn by the switch and integrate the total current and power from the actual current peaks.

In normal use, the external load impedance may be purely capacitive, and the external load impedance $Z_{EXT}$ may be replaced with the coupling capacitance $C_{EXT}$. The peak value of the response by the output voltage $V_O$ to the flyback excitation may be modeled, for example, as second-order polynomial function of this capacitance $C_{EXT}$. Once the output voltage $V_O$ has been measured, this capacitance $C_{EXT}$ may be calculated. Accordingly, once the capacitive load $C_{EXT}$ is known, the maximum allowed slew rate may be obtained by the following equation:

$$dV/dt = I_{MAX}/C_{EXT}.$$

In a situation where a cover (e.g., an outer casing or housing) of the device (e.g., mobile device 5) has been damaged such that the user can accidentally touch a component carrying the high-voltage signal (e.g., a high-voltage signal line), the external load impedance $Z_{EXT}$ may include (e.g., consist of) both resistive and capacitive elements. If the external load $Z_{EXT}$ happens to be purely capacitive, the treatment in the previous paragraph holds true. However, in some scenarios, it may not be possible to distinguish a relatively low-impedance resistive load from a capacitive load of about same impedance level just by considering the peak amplitude of the output voltage $V_O$. Instead, the resistive load may be detected by measuring the discharge rate following (e.g., after) the amplitude peak. Since the internal resistive load in the voltage source 10 is of the order of 100 MΩ, it may be relatively straightforward to detect resistive loads of about 2 MΩ or lower. In many example embodiments, this resistance level is adequate, because current flowing from a output voltage of 1 kV to a load of 2 MΩ load is 0.5 mA. In many situations, actually measuring the value of the resistive load is optional, and it may be sufficient to detect the presence of the resistive load and use it as an indicator of a fault condition.

According to various example embodiments, typical parameters for a pilot pulse are: a peak voltage of 50-150 V, a rise time of 50-200 μs to maximum value, and a total duration 0.5-1.0 ms. The total duration of the pulse may be determined by the time elapsed in measuring the discharge rate. The limiting of the current may become active when the coupling capacitance $C_{EXT}$ exceeds a threshold value of about 200 pF.

Because the coupling capacitance $C_{EXT}$ may be relatively small compared to a typical capacitive internal load impedance $Z_{INT}$, any errors from natural variations in electronics components and in the value of $Z_{INT}$ can be significant sources of error. A good way to compensate for such errors is to calibrate the measurement as follows: The original polynomial has been obtained using a representative electronic circuit and a nominal load capacitance. Once the host system (e.g., mobile device 5) indicates that there are no objects (e.g., body members, such as fingertips) in the proximity of the screen (e.g., display 9), the digital control 23 may execute one pilot pulse and measure both the peak voltage and the discharge rate. Hence, in performing load measurement, the peak voltage measured during calibration may be used for normalizing the actual voltage output $V_O$ reading (e.g., before applying the model). Similarly, the discharge rate measured during calibration may be used for adjusting the threshold for detecting the resistive load.

When adjusting the haptic effect pulse shape based on the external load information, the host system (e.g., mobile device 5) may also take into account the frequency dependence illustrated in FIG. 8. Furthermore, the procedure for pulse waveform adjustment may take into account the gain $A(V_O, dV/dt)$ and output impedance $Z_O(V_O, dV/dt)$ of the voltage source 10.

In certain example embodiments, control of the output current is based on a direct estimate of the output current $I_{EXT}$. The principle involved is that if the output current $I_{EXT}$ gets close or exceeds a predefined threshold value, either the slew rate or the amplitude of the input signal $V_{IN}$ is suitably reduced. Accordingly, the digital control 23 may implement a control algorithm that uses reference information, such as predetermined (e.g., a priori, hardcoded, or otherwise predefined prior to run time) information, about the gain $A(V_O, dV/dt)$ and the output impedance $Z_O(V_O, dV/dt)$. In some example embodiments, a high-level closed loop control is applied such that the input signal $V_{IN}$ is iteratively reduced until the output voltage $V_O$ is within desired limits. This kind of feedback mechanism provides control of the output current independently of complex parameters, such as the gain $A(V_O, dV/dt)$ and the output impedance $Z_O(V_O, dV/dt)$.

One way of measuring the outgoing current would be to have a current sensor in series with the outgoing signal line (e.g., between the resistor 17 that represents the internal load impedance $Z_{INT}$ and the resistor 18 that represents the external load impedance $Z_{EXT}$, as shown in FIG. 6). However, this may not be possible because of the mechanical structure of the system (e.g., mobile device 5). In FIG. 6, $Z_{INT}$ is the capacitance between the electrode 8 and device reference (e.g., chassis ground, represented by the display 9) and $Z_{EXT}$ is the capacitance between the user's finger and the electrode 8. There is no independent conductor that would carry only the outgoing current $I_{EXT}$. Thus, the signals that can be measured are output voltage $V_O$ and the total current $I_{TOT}=I_{INT}+I_{EXT}$. In other words, the output current $I_{EXT}$ is to be calculated as a difference between the total current and internal current: $I_{EXT}=I_{TOT}-I_{INT}$.

Figure 9:
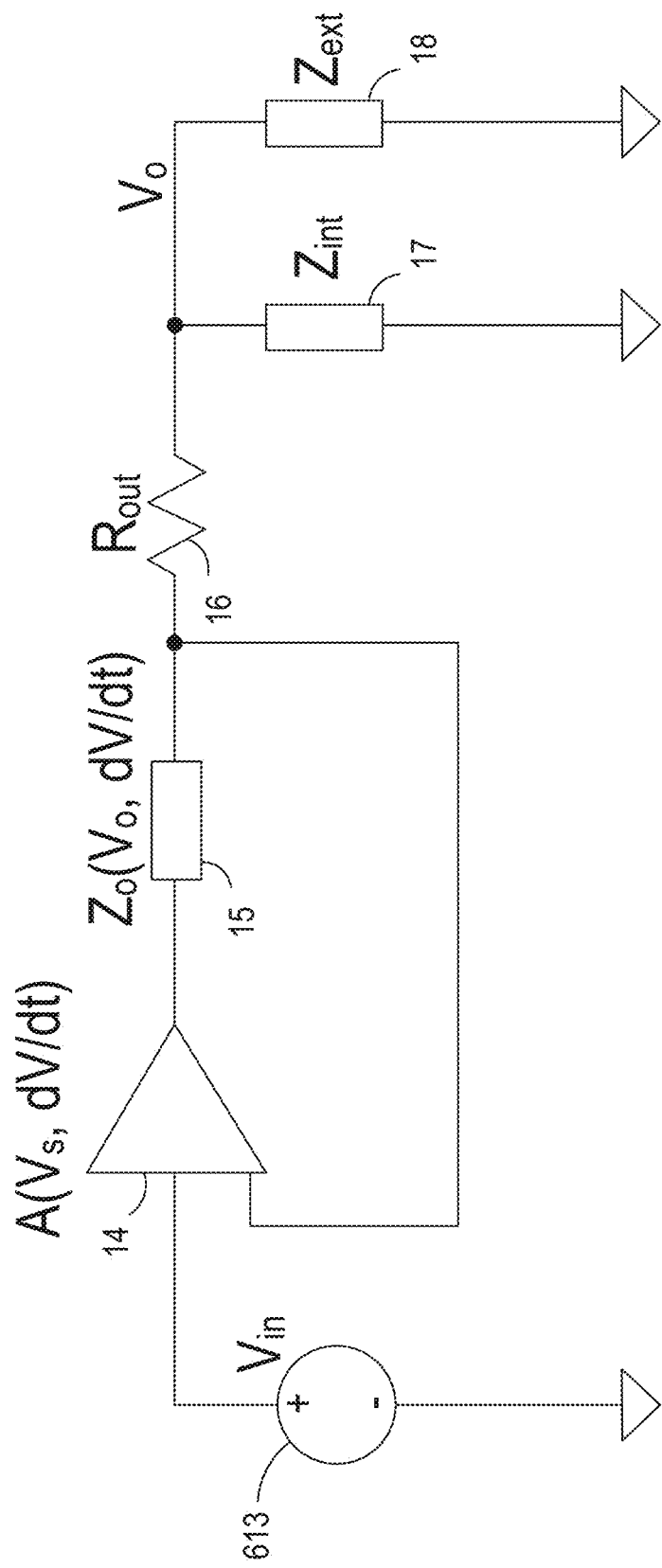
FIGS. 9-13 are circuit diagrams illustrating equivalent circuits for a voltage source and its electrical load, according to some example embodiments.
Figure 10:
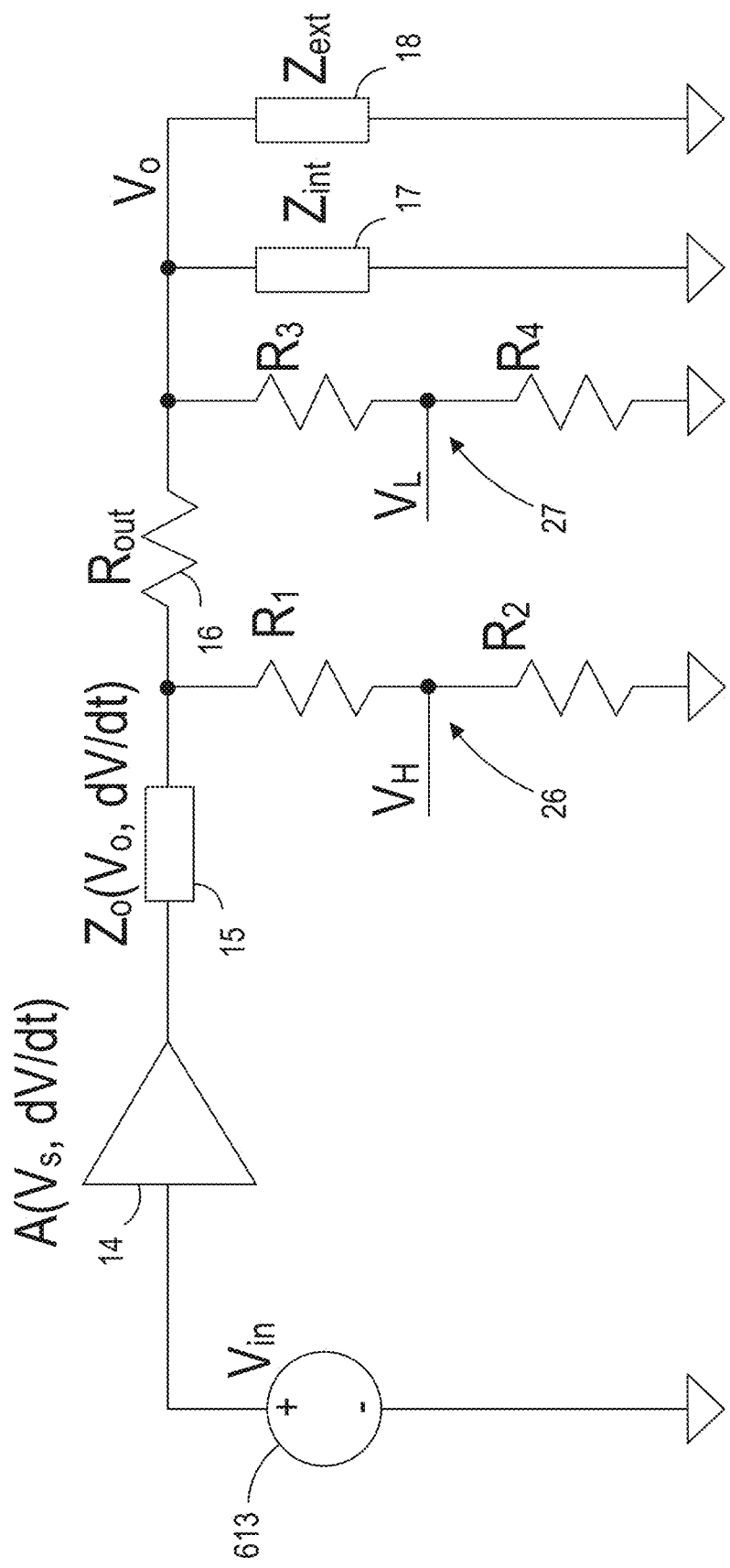

There are several ways to measure $I_{TOT}$. One way is to place a known impedance between the amplifier 14 and the combined load $Z_{INT}+Z_{EXT}$ represented in FIG. 10 by the resistors 17 and 18. As shown in FIG. 10, the measurement element is represented by a resistor 16 with resistance $R_{OUT}$. Voltages $V_H$ and $V_L$ on both sides of the resistor 16 may be measured through a high-voltage resistor divider 26 ($R_1/R_2$) and another high-voltage resistor divider 27 ($R_3/R_4$), respectively. These two resistor dividers 26, 27 may consume a significant amount of circuit board space and may increase the power consumption of the system (mobile device 5). In contrast to this situation, FIG. 9 shows only the output voltage $V_O$ being measured explicitly. This is because the amplifier 14 and its output impedance $Z_O(V_O, dV/dt)$ represented by the resistor 15 have been encapsulated inside a closed feedback loop. This way, the output voltage $V_O$ may be known, being an amplified version of the input signal $V_{IN}$. Moreover, the output impedance of the measurement element, represented by the resistor 16, is known and equal to $R_{OUT}$.

Figure 11:
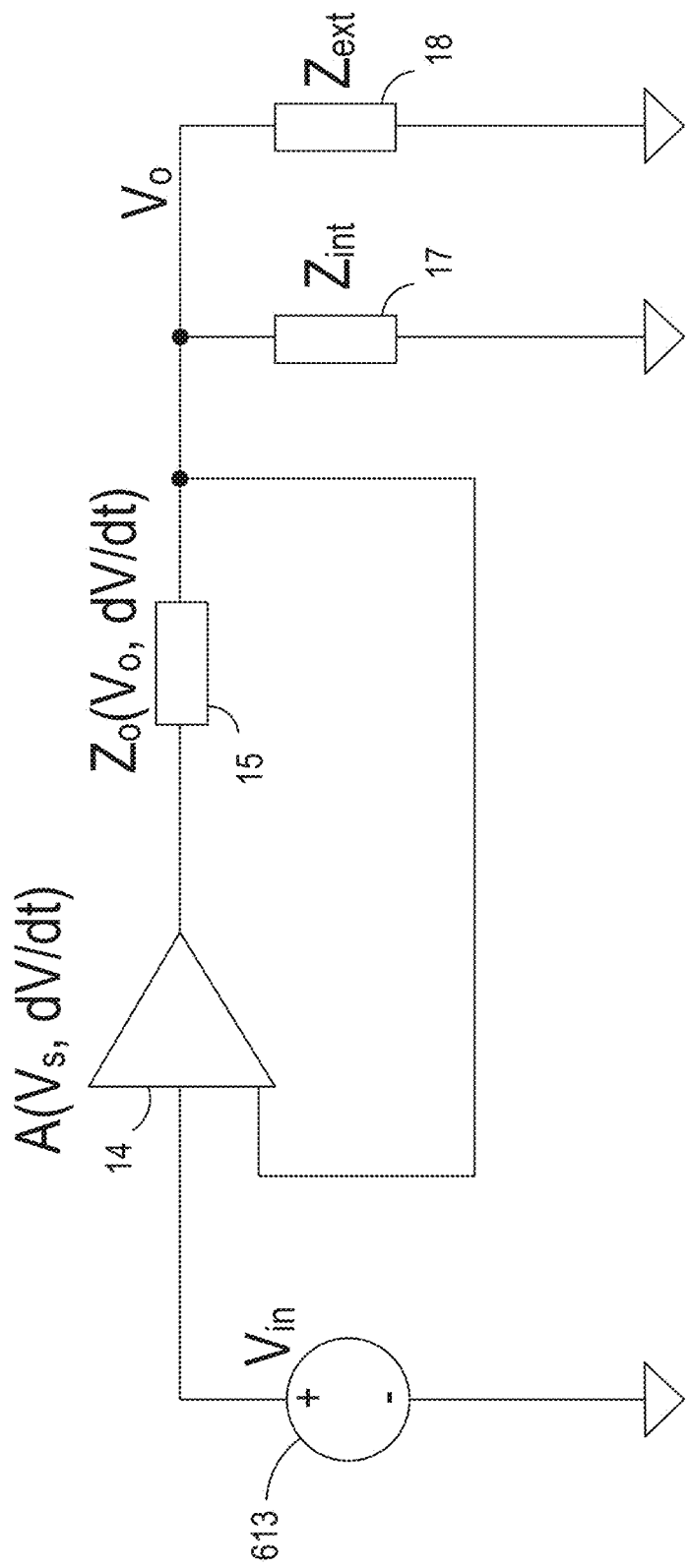

FIG. 11 illustrates a special example embodiment of the equivalent circuit shown in FIG. 9. If the resistance $R_{OUT}$ represented by the resistor 16 in FIG. 9 reduces to zero, the output voltage $V_O$ becomes only an amplified version of the input signal $V_{IN}$, and information about the current outside of the feedback loop is no longer available. In such a situation, the voltage over the load may be well known, but information regarding the current is no longer obtainable from voltage measurements. However, the difference signal of the feedback system—that is, the voltage difference between the input nodes of the amplifier 14—may be used as an indication of the external load impedance; the larger output current, the larger the difference signal. This dependency may be monotonic. However, due to the complex nature of the gain $A(V_O, dV/dt)$ of the loop and the open loop impedance $Z_O(V_O, dV/dt)$, calculating the actual value of the total current $I_{TOT}$ may be processor intensive. Furthermore, if the frequency dependency defined in IEC 60950-1 (e.g., as shown in FIG. 8) is taken into account, the measurement is no longer instantaneous. Instead, the shape of the waveform of the haptic effect pulse should be considered, at least because the lower time constant of the frequency response corresponds to a time constant of about 220 μs.

Various types of high-side current sensors (e.g., a simple shunt resistor or a current transformer) may be placed in series with the signal output of the voltage source 10. The fundamental issues with high-side current sensors include bringing the measurement signal down to the signal levels of the control integrated circuit (IC) and delivering supply power in the case of active measurement circuits. For example, if the signal is detected using a shunt resistor (e.g., resistor 16, as shown in FIGS. 9 and 10), the signal can be shifted down using voltage dividers (e.g., resistor dividers 26 and 27, as shown in FIG. 10). High-voltage resistor dividers may consume large amounts of circuit board space and may cause some additional errors in the measurement. Thus, the use of high-side current measurement circuits may be costly, at least in terms of both component count and circuit board space.

As mentioned above, one way to estimate the magnitude of the external load impedance $Z_{EXT}$ is to use information about the input power drawn by the voltage source 10. When combined with output voltage $V_O$ information, it is possible to obtain an estimate of total current $I_{TOT}$ from the input power measurement data.

Referring back to FIG. 7, the equivalent circuit illustrated therein implements an example of a way to measure the total current $I_{TOT}$. This solution is based on the isolating feature of a transformer-based power converter (e.g., a flyback transformer 19). Because of this isolating feature, it is possible to build a charger (e.g., the combination of the flyback transformer 19 and the multiplier 20) and a discharger (e.g., discharger 21) as electrically floating entities. This electrically floating high-voltage area 24 is indicated in FIG. 7 with a rectangular shape (e.g., square). It is possible to place a current measurement resistor 22 with resistance $R_{SHUNT}$ between the device reference (e.g., system ground) and the floating high-voltage area 24. As shown in FIG. 7, a current measurement component represented by the resistor 22 with resistance $R_{SHUNT}$ may measure the total current returning to the isolated high-voltage area 24.

Compared to high-side current measurement, the circuit in FIG. 7 has at least two benefits. First, no high-voltage resistor dividers are used. Second, only one voltage measurement is used, because one end of the current measurement resistor 22 is tied to ground. On the other hand, this configuration may be specifically suited for topologies that are based on a transformer (e.g., flyback transformer 19).

In addition, the discharge current may be measured with the same circuit shown in FIG. 7. Even though the discharger 21 (e.g., a discharge transistor) may not be strictly floating, the input impedance of the gate of the lowest transistor may be sufficiently high such that the error due to the gate current is negligible. Also, the voltage over the resistor 22 with resistance $R_{SHUNT}$ may remain small compared to the voltage $V_{GS}$ of the discharger 21.

If the output voltage $V_O$ is measured with a high-voltage resistor divider, the low side of a resistor divider (e.g., resistor divider 26 or 27, as shown in FIG. 10) may be connected to the device reference (e.g., system ground). The current through this circuit may be included in the measurement of the total current $I_{TOT}$ correctly, but may appear in the calculation of the external current $I_{EXT}$.

Calculation of the internal current $I_{INT}$ may be based on the fact that the internal load impedance $Z_{INT}$ is well known for a certain model of the device (e.g., mobile device 5). If the internal load is purely capacitive such that $Z_{INT}=C_{INT}$, the internal current can be calculated as $I_{INT}=C_{INT}\times dV_O/dt$. As described above, the output voltage $V_O$ may generally be measured anyway for providing feedback about the high-voltage signal, and therefore no extra circuitry may be used or included for calculation of the internal current $I_{INT}$.

All the signals above may be time-continuous. Hence, the continuous calculation of the external current $I_{EXT}$ may be expressed as:

$$I_{EXT}(t) = I_{TOT}(t) - I_{INT}(t)$$
$$= V_{SHUNT}(t)/R_{SHUNT} - C_{INT} \times dV_O(t)/dt$$

As mentioned above with respect to FIG. 8, the international standard IEC 60950-1 allows larger current at higher frequencies. In order to fully utilize the allowable range for current, the measurement of the current may take into account this frequency dependence. This can be done by filtering $I_{EXT}(t)$ before comparing the voltage signal to a threshold value.

Figure 12:
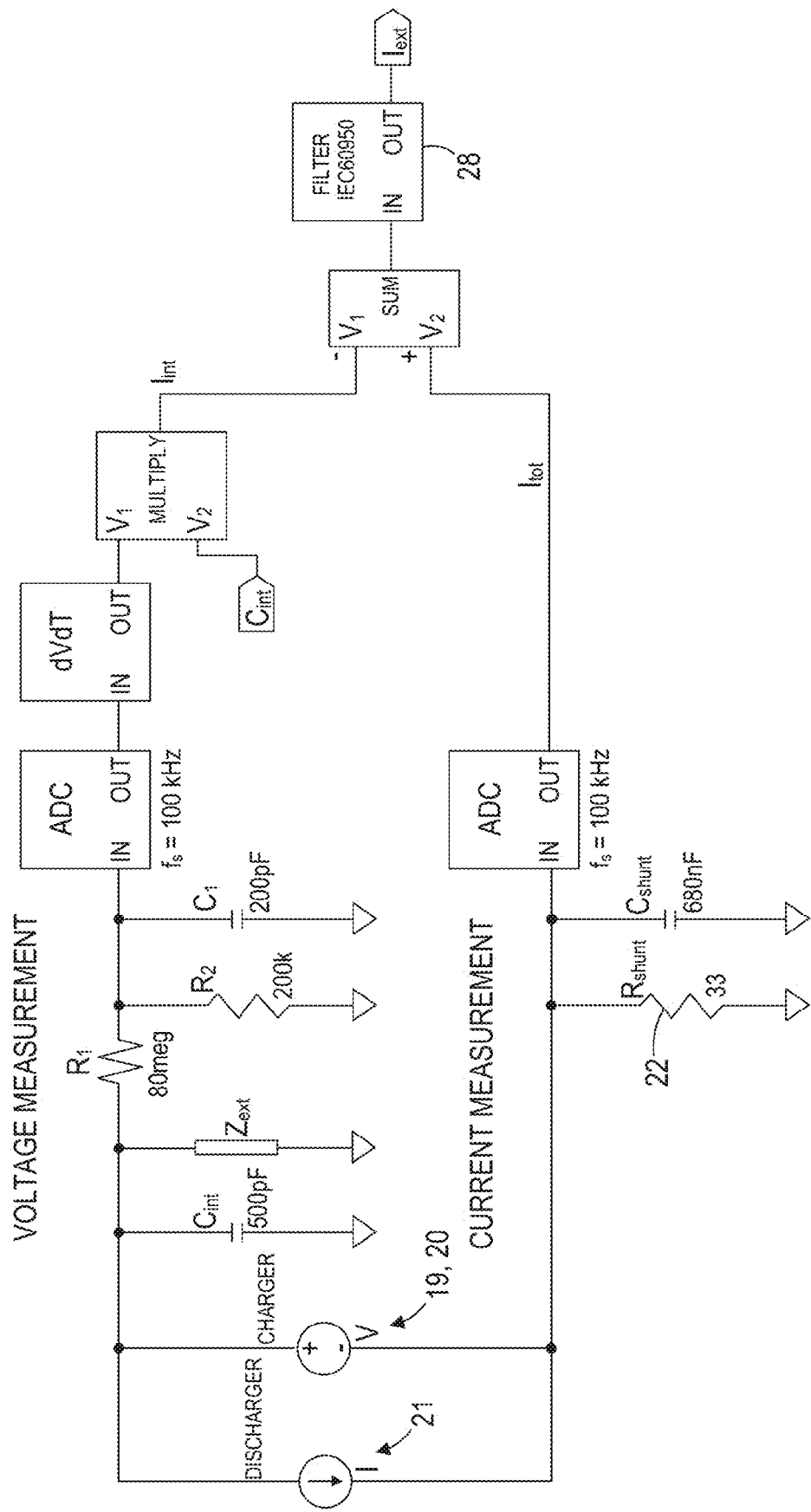

FIG. 12 is a block diagram of an example configuration (e.g., setup) for current measurement. The charger (e.g., the combination of the flyback transformer 19 and the multiplier 20) and the discharger 21 are illustrated as voltage and current sources, respectively. The output voltage $V_O$ may be measured through a voltage divider network with resistors $R_1$ and $R_2$ and an anti-aliasing filter $C_1$. The total current $I_{TOT}$ may be measured as voltage over a resistor 22 with resistance $R_{SHUNT}$ and a filter capacitor with capacitance $C_{SHUNT}$. Both signals may be sampled at a sampling frequency of 100 kHz (e.g., for digital processing). The voltage signal may be differentiated and multiplied with $C_{INT}$ to obtain the internal current $I_{INT}$. The total current $I_{TOT}$ may be obtained directly by measurement. Thus, the external current $I_{EXT}$ may be obtained as the difference between the total current $I_{TOT}$ and the internal current $I_{INT}$. In order to fully utilize the allowed range for current, the external current $I_{EXT}$ may be filtered using a filter 28 that approximates the frequency response specified in IEC 60950-1.

Figure 13:
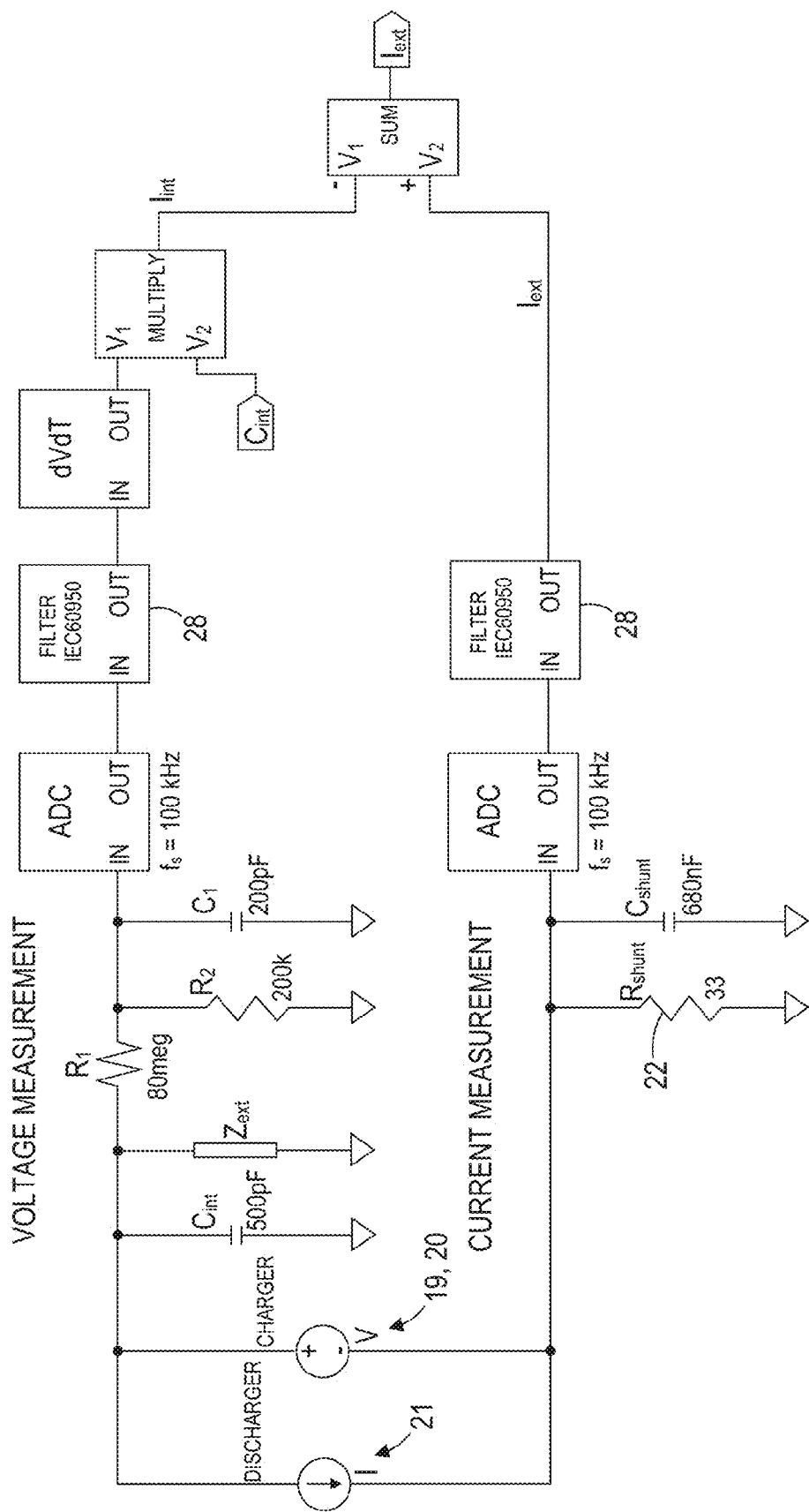

FIG. 13 illustrates an alternative configuration for the calculation, according to various example embodiments. As shown, the filtering by the filter 28 may be performed immediately following the analog-to-digital conversion. Such rearrangement of the calculation is possible due to the linear nature of the calculation. In addition to the above-described operations, one or more of various offset correction operations and scaling operations may be added to the algorithm. Similarly, one or more shift operations or additional filter stages may be added to compensate for differences in the hardware responses of the voltage and current channels.

Once the external current $I_{EXT}$ has been calculated and filtered, it may be compared directly to the nominal 0.7 mA threshold value, as set forth in the IEC 60950-1 standard. Accordingly, if the finger current is about to reach this threshold value, the voltage source 10 may stop producing (e.g., playing) haptic effect pulses altogether. Alternatively, the voltage source 10 may reduce the slew rate or the signal amplitude in order to keep the external current within limits. The latter approach may provide the benefit of avoiding abrupt changes being perceived by the user. Because the user may tend to perceive the same effect as being stronger when touching with several fingers, it may be beneficial to reduce the effect amplitude in multi-touch cases.

In addition to the 0.7 mA peak value for steady-state current patterns, IEC 60950-1 sets a 45 µC limit for non-repeating surge currents. In certain example embodiments, it may be practically impossible for the voltage source 10 to inject as much as 45 µC of charge to any capacitive load. In such example embodiments, for an intact system (e.g., mobile device 5) in which the coupling between the user and the voltage source 10 is only through the front glass (e.g., display 9), there is no risk of exceeding the 45 µC limit.

Under a fault condition in which the user directly touches the output of the voltage source 10, and the voltage source 10 stays active for a prolonged time (e.g., 30 ms), it may be possible to exceed the 45 µC limit set by IEC 60950-1. In such conditions, the voltage source 10 would drive a relatively low voltage (e.g., 10 V) to a resistive load of about 2 kΩ. After a certain period of time, the amount of accumulated charge $Q = \int I \, dt$ may exceed the 45 µC limit.

There are multiple ways to handle this fault condition. One solution is to calculate the amount of charge injected into the external load for each haptic effect pulse by integrating the external current $I_{EXT}$ over time. If the resulting integral transgresses (e.g., exceeds) a predefined threshold value, the voltage source 10 may be turned off. Alternatively, this fault condition may be detected based on the fact that, in the case of a resistive load, the current is relatively large, even when the high-voltage signal is not changing. A haptic effect pulse may have a waveform with a flat period of 1 ms on the top, for example, as shown in FIG. 5. For an open-loop controlled system, the output voltage $V_O$ may decline because of the resistive load. Similarly, for a closed-loop controlled system, the difference signal at the input of the voltage source may increase accordingly.

The third criterion mentioned in the international standard IEC 60950-1 is that DC current shall remain below 2 mA. The voltage source 10 may be capable of supplying this kind of continuous current if the resistive load impedance is relatively low (e.g., typically below 5 kΩ). This condition may be readily handled by the same algorithm discussed above, for example, by handling the charge accumulation and turning off the high-voltage generation if the amount of injected charges by the DC current exceeds a predefined limit.

Figure 14:
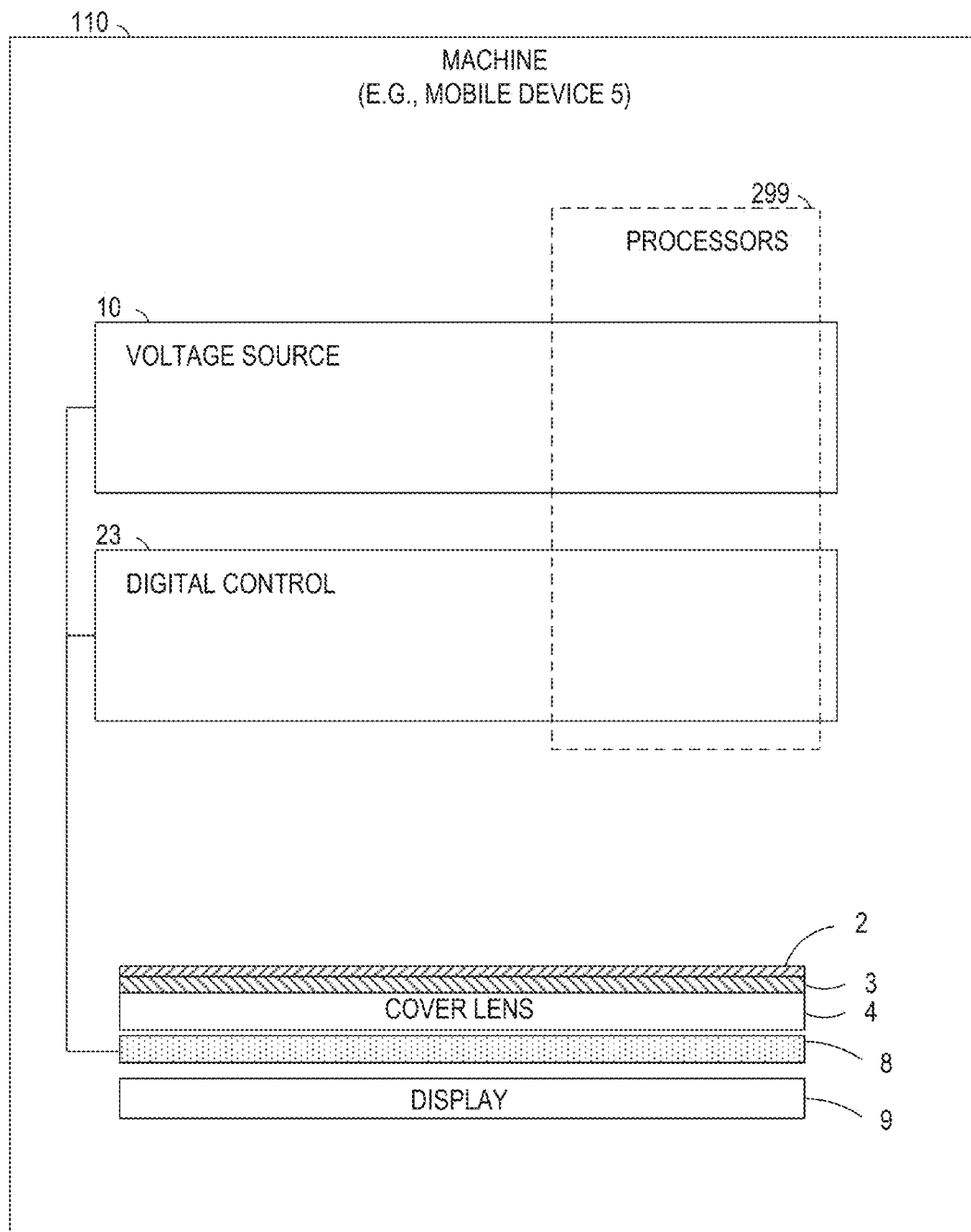
FIG. 14 is a block diagram illustrating machine components that are suitable for controlling output current, according to some example embodiments.

FIG. 14 is a block diagram illustrating components of a system (e.g., an apparatus) in the example form of a machine 110 (e.g., a device, such as the mobile device 5), according to some example embodiments. The machine 110 is shown as including the voltage source 10 (e.g., circuitry discussed above with respect to any of FIGS. 3-13), the digital control 23 (e.g., a controller), the insulative layer 2, the conductive layer 3, the surface 4 (e.g., cover lens), the electrode 8, and the display 9, as well as any one or more of various components or circuitry for measurement and detection, as described above. The machine 110 may be implemented in a computer system, in whole or in part, as described below with respect to FIG. 15.

The voltage source 10, the digital control 23, and other components or circuitry (e.g., configured for measurement and detection) described above may each be implemented using hardware alone (e.g., one or more processors 299 of a machine) or a combination of hardware and software. For example, any one or more of these components or circuits may physically include an arrangement of one or more processors 299 (e.g., a subset of or among the one or more processors 299 of the machine 110) configured to perform the operations described herein for that component or circuitry. As another example, any one or more of these components or circuits may include software, hardware, or both, that configure an arrangement of one or more processors 299 (e.g., among the one or more processors 299 of the machine 110) to perform the operations described herein for that component or circuit. Accordingly, different components and circuits described herein may include and configure different arrangements of such processors 299 or a single arrangement of such processors 299 at different points in time. Moreover, any two or more components or circuits described herein may be combined into a single component or circuit, and the functions described herein for a single component or circuit may be subdivided among multiple components or circuits. Furthermore, according to various example embodiments, components and circuitry described herein as being implemented within a single machine may be distributed across multiple machines.

Figure 15:
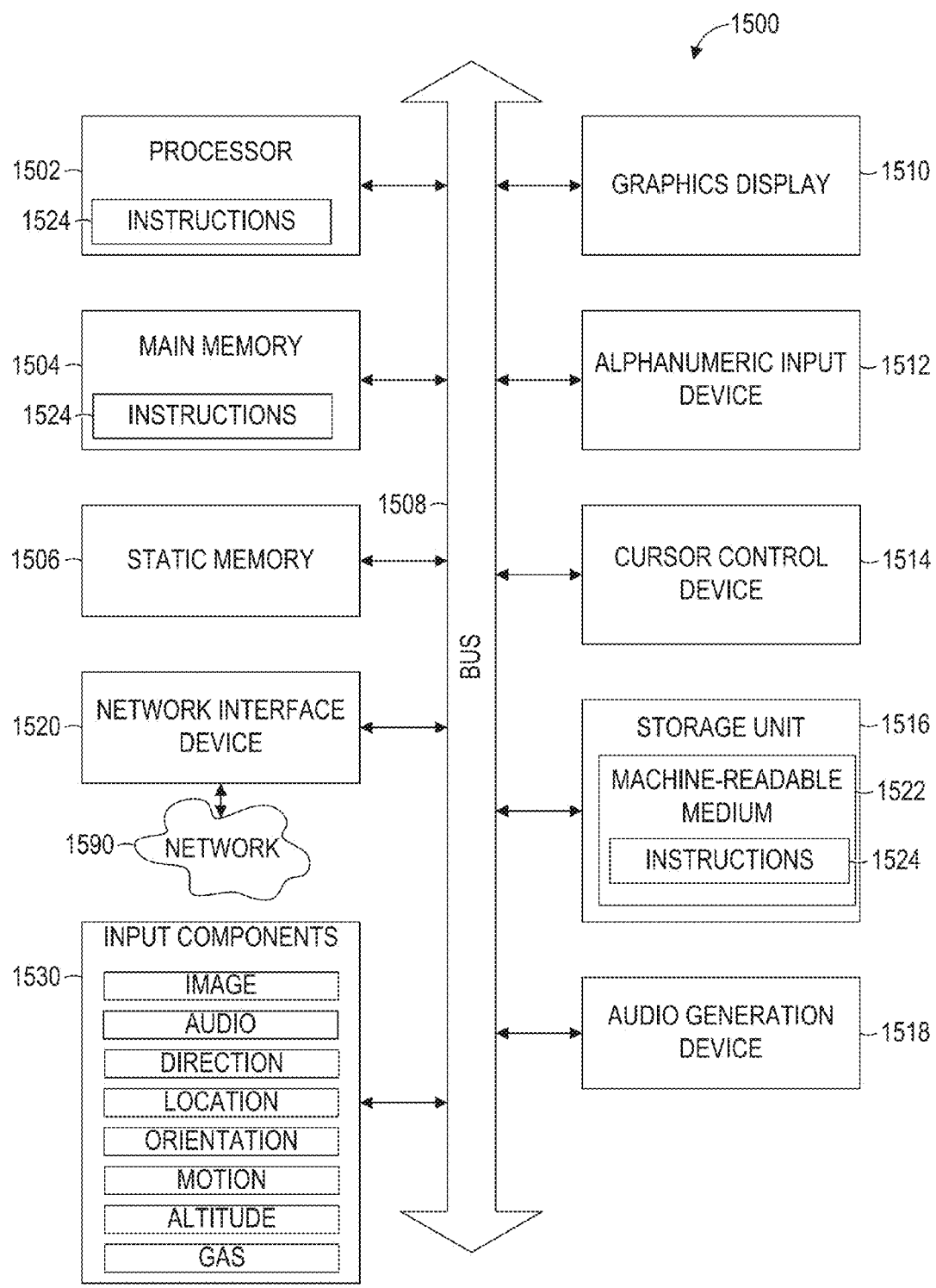
FIG. 15 is a block diagram illustrating components of a machine, according to some example embodiments, able to read instructions from a machine-readable medium and perform any one or more of the methodologies discussed herein.

FIG. 15 is a block diagram illustrating components of a machine 1500, according to some example embodiments, able to read instructions 1524 from a machine-readable medium 1522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 15 shows the machine 1500 in the example form of a computer system (e.g., a computer) within which the instructions 1524 (e.g., software, a program, an application, an applet, an app, or other executable code) for causing the machine 1500 to perform any one or more of the methodologies discussed herein may be executed, in whole or in part.

In alternative embodiments, the machine 1500 operates as a standalone device or may be communicatively coupled (e.g., networked) to other machines. In a networked deployment, the machine 1500 may operate in the capacity of a server machine or a client machine in a server-client network environment, or as a peer machine in a distributed (e.g., peer-to-peer) network environment. The machine 1500 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include any collection of machines that individually or jointly execute the instructions 1524 to perform all or part of any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The processor 1502 may contain solid-state digital microcircuits (e.g., electronic, optical, or both) that are configurable, temporarily or permanently, by some or all of the instructions 1524 such that the processor 1502 is configurable to perform any one or more of the methodologies described herein, in whole or in part. For example, a set of one or more microcircuits of the processor 1502 may be configurable to execute one or more modules (e.g., software modules) described herein. In some example embodiments, the processor 1502 is a multicore CPU (e.g., a dual-core CPU, a quad-core CPU, or a 128-core CPU) within which each of multiple cores is a separate processor that is able to perform any one or more the methodologies discussed herein, in whole or in part. Although the beneficial effects described herein may be provided by the machine 1500 with at least the processor 1502, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1500 may further include a graphics display 1510 (e.g., a plasma display panel (PDP), a light emitting diode (LED) display, a liquid crystal display (LCD), a projector, a cathode ray tube (CRT), or any other display capable of displaying graphics or video). The machine 1500 may also include an alphanumeric input device 1512 (e.g., a keyboard or keypad), a cursor control device 1514 (e.g., a mouse, a touchpad, a trackball, a joystick, a motion sensor, an eye tracking device, or other pointing instrument), a storage unit 1516, an audio generation device 1518 (e.g., a sound card, an amplifier, a speaker, a headphone jack, or any suitable combination thereof), and a network interface device 1520.

The storage unit 1516 includes the machine-readable medium 1522 (e.g., a tangible and non-transitory machine-readable storage medium) on which are stored the instructions 1524 embodying any one or more of the methodologies or functions described herein. The instructions 1524 may also reside, completely or at least partially, within the main memory 1504, within the processor 1502 (e.g., within the processor's cache memory), or both, before or during execution thereof by the machine 1500. Accordingly, the main memory 1504 and the processor 1502 may be considered machine-readable media (e.g., tangible and non-transitory machine-readable media). The instructions 1524 may be transmitted or received over the network 1590 via the network interface device 1520. For example, the network interface device 1520 may communicate the instructions 1524 using any one or more transfer protocols (e.g., hypertext transfer protocol (HTTP)).

In some example embodiments, the machine 1500 may be a portable computing device, such as a smart phone or tablet computer, and have one or more additional input components 1530 (e.g., sensors or gauges). Examples of such input components 1530 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1524 for execution by the machine 1500, such that the instructions 1524, when executed by one or more processors of the machine 1500 (e.g., processor 1502), cause the machine 1500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof. In some example embodiments, the instructions 1524 for execution by the machine 1500 may be carried by a carrier medium. Examples of such a carrier medium include a storage medium and a transient medium (e.g., a signal carrying the instructions 1524).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., apparatus) discussed herein.

A first embodiment provides an apparatus for producing a tactile sensation to at least one body member, the apparatus comprising:
a voltage source;
a controller; and
an electrode; and wherein
the apparatus (e.g., the controller) is configured to perform operations that comprise:
determining (e.g., measuring) at least one electrical output characteristic (e.g., property) of the voltage source; and
using a priori information about a system internal load and the determined (e.g., measured) electrical output property to adjust an output signal of the voltage source such that electrical current provided by the voltage source to an external load stays below a threshold value.

A second embodiment provides an apparatus according to the first embodiment, wherein the electrical output property of the voltage source is a difference between expected output voltage and measured output voltage.

A third embodiment provides an apparatus according to the second embodiment, wherein the expected voltage output is derived from an input signal of the voltage source using a mathematical model of both the voltage source and the system internal load.

A fourth embodiment provides an apparatus according to the first embodiment, wherein the electrical output property of the voltage source is a difference between an input signal and a feedback signal.

A fifth embodiment provides an apparatus according to any of the second through fourth embodiments, wherein a difference signal is filtered before the difference signal is used for adjusting the output signal.

A sixth embodiment provides an apparatus according to the first embodiment, wherein the at least one electrical output property of the voltage source includes output voltage and total current.

A seventh embodiment provides an apparatus according to the sixth embodiment, wherein an internal current is calculated using the output voltage and a priori information about system internal load impedance.

An eighth embodiment provides an apparatus according to the seventh embodiment, wherein the internal current is calculated by differentiating the output voltage over time.

A ninth embodiment provides an apparatus according to any of the sixth through eighth embodiments, wherein an output current of the apparatus is calculated as a difference between the internal current and the total current.

A tenth embodiment provides an apparatus according to any of the sixth through ninth embodiments, wherein a difference signal is filtered before the difference signal is used for adjusting the output signal.

An eleventh embodiment provides an apparatus for producing a tactile sensation to at least one body member, the apparatus comprising:
a voltage source;
a controller; and
an electrode; and wherein
the apparatus (e.g., the controller) is configured to perform operations that comprise:
measuring a property related to a total load presented to the voltage source;
using a priori information about a dependence between the total load and at least one measured property of the voltage source; and
using the total load information to adjust an output signal of the voltage source such that electrical current provided by the voltage source to an external load stays below a threshold value.

A twelfth embodiment provides an apparatus according to the eleventh embodiment, wherein the measured property is a difference between an input signal of the voltage source and a feedback signal.

A thirteenth embodiment provides an apparatus according to the eleventh embodiment, wherein the measured property is a difference between an expected output signal and an actual output signal, the expected output signal being determined using a priori information about properties of the voltage source and an internal load.

A fourteenth embodiment provides an apparatus according to the eleventh embodiment, wherein adjusting the output signal includes modifying a shape of a waveform of the output signal.

A fifteenth embodiment provides an apparatus according to the fourteenth embodiment, wherein the modifying of the shape of waveform of the output signal includes blocking the output signal.

A sixteenth embodiment provides an apparatus according to any of the eleventh through fifteenth embodiments, wherein the at least one measured property is filtered before the at least one measured property is used for adjusting the output signal.

A seventeenth embodiment provides an apparatus according to any of the eleventh through fifteenth embodiments, wherein the dependence between the total load and at least one measured property of the voltage source is filtered before the dependence is used for adjusting the output signal.

An eighteenth embodiment provides an apparatus according to any of the eleventh through seventeenth embodiments, wherein the at least one measured property is determined during provision of haptic effect pulses.

A nineteenth embodiment provides an apparatus according to any of the eleventh through seventeenth embodiments, wherein the at least one measured property is determined during a dedicated measurement pulse that precedes haptic effect pulses.

A twentieth embodiment provides an apparatus according to the eighteenth embodiment or the nineteenth embodiment, wherein amplitudes of the haptic effect pulses are iteratively increased up to a predefined limit.

A twenty first embodiment provides an apparatus for producing a tactile sensation to at least one body member, the apparatus comprising:
a voltage source;
a controller; and
an electrode; and wherein
the apparatus (e.g., the controller) is configured to perform operations that comprise:
determining information about an external current of the voltage source as a difference between total current of the voltage source and an internal current of the voltage source; and
using the information about the external current to adjust an output signal of the voltage source such that electrical current provided by the voltage source to an external load stays below a threshold value.

A twenty second embodiment provides an apparatus according to the twenty first embodiment, wherein the internal current is determined using a priori information of the system internal load.

A twenty third embodiment provides an apparatus according to the twenty second embodiment, wherein the internal current is calculated by dividing the output voltage of the voltage source with a known internal load impedance of the apparatus (e.g., a predetermined internal load impedance of the voltage source or other reference internal load impedance of the voltage source).

A twenty fourth embodiment provides an apparatus according to the twenty second embodiment or the twenty third embodiment, wherein the internal current is calculated as a derivative (e.g., a mathematical derivative) of the output voltage of the voltage source.

A twenty fifth embodiment provides an apparatus according to the twenty first embodiment, wherein the total current of the voltage source is determined using a current measurement circuit that measures current flowing from the voltage source at a high-voltage side of the voltage source.

A twenty sixth embodiment provides an apparatus according to the twenty first embodiment, wherein the total current of the voltage source is determined using a current measurement circuit that measures a return current from ground (e.g., device reference or system ground) to the voltage source.

A twenty seventh embodiment provides an apparatus according to the twenty first embodiment, wherein the total current of the voltage source is determined from supply power drawn by the voltage source.

A twenty eighth embodiment provides an apparatus according to the twenty seventh embodiment, wherein the supply power drawn by the voltage source is calculated from a count of cycles of a current-controlled power switch electrically coupled to the voltage source.

A twenty ninth embodiment provides an apparatus according to the twenty seventh embodiment, wherein the supply power drawn by the voltage source is calculated from measured current pulse amplitudes of a power switch electrically coupled to the voltage source.

A thirtieth embodiment provides an apparatus according to the twenty seventh embodiment, wherein the supply power drawn by the voltage source is calculated from measured direct current supplying a power switch electrically coupled to the voltage source.

A thirty first embodiment provides an apparatus according to any of the twenty first through thirtieth embodiments, wherein the total current and the internal current are scaled using a priori information about properties of the apparatus (e.g., the voltage source).

A thirty second embodiment provides an apparatus according to the thirty first embodiment, wherein the total current and the internal current are further scaled using device-specific calibration information of the apparatus.

A thirty third embodiment provides an apparatus according to any of the twenty first through thirty second embodiments, wherein a difference signal is filtered before the difference signal is used for adjusting the output signal.

A thirty fourth embodiment provides an apparatus according to any of the twenty first through thirty second embodiments, wherein a filtered difference signal is obtained by filtering both the total current and the internal current separately before subtracting the internal current from the total current to obtain the difference signal.

A thirty fifth embodiment provides an apparatus according to any of the first through thirty fourth embodiments, wherein accumulation of excessive charges in the apparatus (e.g., on the electrode) is prevented based on information about a time integral of the external current.

The thirty sixth embodiment provides an apparatus according to any of the first to thirty fifth embodiments, wherein accumulation of excessive charges in the apparatus (e.g., on the electrode) is prevented based on a priori information about a maximum total current of the voltage source.

A thirty seventh embodiment provides a carrier medium carrying machine-readable instructions for controlling a machine (e.g., an apparatus or a hardware component thereof, such as a processor configured as a controller) to carry out the method of any one of the previously described embodiments.

What is claimed is:

1. An apparatus comprising:
   an electrode having a reference internal load impedance and configured to hold an electrical charge;
   a voltage source having a reference output impedance and configured to provide an output voltage that supplies the electrical charge to the electrode that has the reference internal load impedance, the output voltage creating an external electrical current from the voltage source to an external load; and
   a controller configured to confine the external electrical current below a reference threshold current by controlling the output voltage of the voltage source, the controlling of the output voltage including:
      determining a first electrical output characteristic of the voltage source by measuring the output voltage;
      determining a second electrical output characteristic of the voltage source by determining a total electrical current from the voltage source to the external load and to an internal load of the electrode; and
      adjusting the output voltage based on the determined output voltage, based on the total electrical current, based on the reference output impedance of the voltage source, and based on the reference internal load impedance of the electrode.

2. The apparatus of claim 1, wherein:
   the controller is further configured to calculate a difference between an expected output voltage and the measured output voltage.

3. The apparatus of claim 2, wherein:
   the controller is further configured to take a measurement from an input signal of the voltage source and calculate the expected voltage output based on the measurement taken from the input signal, on the reference output impedance of the voltage source, and on the reference internal load impedance of the electrode.

4. The apparatus of claim 1, wherein:
   the controller is further configured to determine a difference between an input signal to the voltage source and a feedback signal.

5. The apparatus of claim 1, wherein:
   the controller is further configured to determine and filter a difference signal before adjusting the output voltage based on the filtered difference signal.

6. The apparatus of claim 1, wherein:
   the controller is configured to:
      calculate an internal electrical current based on the output voltage of the voltage source and based on the reference internal load impedance of the electrode; and
      determine the total electrical current based on the internal electrical current.

7. The apparatus of claim 6, wherein:
   the controller is configured to calculate the internal electrical current by differentiating the output voltage over time.

8. The apparatus of claim 1, wherein:
   the controller is configured to calculate the external electrical current by subtracting the internal electrical current from the total electrical current.

9. An apparatus comprising:
   an electrode having a reference internal load impedance and configured to hold an electrical charge;
   a voltage source configured to provide an output voltage that supplies the electrical charge to the electrode that has the reference internal load impedance, the output voltage creating an external electrical current from the voltage source to an external load; and
   a controller configured to confine the external electrical current below a reference threshold current by controlling the output voltage of the voltage source, the controlling of the output voltage including:
      determining the internal electrical current by dividing the output voltage of the voltage source with the reference internal load impedance of the electrode;
      determining a difference between a total electrical current flowing from the voltage source and an internal electrical current flowing from the voltage source to an internal load, the determined difference being equivalent to the external electrical current from the voltage source; and
      adjusting the output voltage based on the determined difference that is equivalent to the external electrical current from the voltage source.

10. The apparatus of claim 9, wherein:
    the controller is configured to determine a waveform of the internal electrical current by calculating a derivative of the output voltage of the voltage source.

11. The apparatus of claim 9, further comprising:
    a current measurement circuit configured to measure current flowing from the voltage source at a high-voltage side of the voltage source; and wherein
    the controller is configured to determine the total electrical current of the voltage source by causing the current measurement circuit to measure the total electrical current at the high-voltage side of the voltage source.

12. The apparatus of claim 9, further comprising:
    a current measurement circuit configured to measure a return electrical current flowing from a ground of the apparatus to the voltage source; and wherein
    the controller is configured to determine the total electrical current of the voltage source based on the return electrical current by causing the current measurement circuit to measure the return electrical current.

13. The apparatus of claim 9, wherein:
the controller is configured to determine the total electrical current of the voltage source based on supply power drawn by the voltage source.

14. The apparatus of claim 13, wherein:
the controller is configured to calculate the supply power drawn by the voltage source based on a count of cycles of a current-controlled power switch electrically coupled to the voltage source.

15. The apparatus of claim 13, wherein:
the controller is configured to calculate the supply power drawn by the voltage source based on amplitudes of current pulses of a power switch electrically coupled to the voltage source.

16. The apparatus of claim 13, wherein:
the controller is configured to calculate the supply power drawn by the voltage source based on a measurement of direct current supplying a power switch electrically coupled to the voltage source.

17. A method comprising:
determining an electrical output characteristic of a voltage source electrically coupled to an electrode configured to hold an electrical charge;
supplying the electrical charge to the electrode by providing the electrode with an output voltage from a voltage source, the output voltage creating an external electrical current from the voltage source to an external load; and
confining the electrical current below a reference threshold current by controlling the output voltage of the voltage source, the controlling of the output voltage including:
determining a first electrical output characteristic of the voltage source by measuring the output voltage;
determining a second electrical output characteristic of the voltage source by determining a total electrical current from the voltage source to the external load and to an internal load of the electrode; and
adjusting the output voltage based on the determined output voltage, based on the total electrical current, based on a reference output impedance of the voltage source, based on a reference internal load impedance of the voltage source.

18. An apparatus comprising:
an electrode having a reference internal load impedance and configured to hold an electrical charge;
a voltage source configured to provide an output voltage that supplies the electrical charge to the electrode that has the reference internal load impedance, the output voltage creating an external electrical current from the voltage source to an external load;
a current measurement circuit configured to measure current flowing from the voltage source at a high-voltage side of the voltage source; and
a controller configured to confine the external electrical current below a reference threshold current by controlling the output voltage of the voltage source, the controlling of the output voltage including:
determining a total electrical current flowing from the voltage source by causing the current measurement circuit to measure the total electrical current at the high-voltage side of the voltage source;
determining a difference between the total electrical current flowing from the voltage source and an internal electrical current flowing from the voltage source to an internal load, the determined difference being equivalent to the external electrical current from the voltage source; and
adjusting the output voltage based on the determined difference that is equivalent to the external electrical current from the voltage source.

19. A method comprising:
determining an electrical output characteristic of a voltage source electrically coupled to an electrode configured to hold an electrical charge;
supplying the electrical charge to the electrode by providing the electrode with an output voltage from a voltage source, the output voltage creating an external electrical current from the voltage source to an external load; and
confining the electrical current below a reference threshold current by controlling the output voltage of the voltage source, the controlling of the output voltage including:
determining a total electrical current flowing from the voltage source by measuring the total electrical current at a high-voltage side of the voltage source;
determining a difference between the total electrical current flowing from the voltage source and an internal electrical current flowing from the voltage source to an internal load, the determined difference being equivalent to the external electrical current from the voltage source; and
adjusting the output voltage based on the determined difference that is equivalent to the external electrical current from the voltage source.

20. A method comprising:
determining an electrical output characteristic of a voltage source electrically coupled to an electrode configured to hold an electrical charge;
supplying the electrical charge to the electrode by providing the electrode with an output voltage from a voltage source, the output voltage creating an external electrical current from the voltage source to an external load; and
confining the electrical current below a reference threshold current by controlling the output voltage of the voltage source, the controlling of the output voltage including:
determining the internal electrical current by dividing the output voltage of the voltage source with a reference internal load impedance of the electrode;
determining a difference between a total electrical current flowing from the voltage source and an internal electrical current flowing from the voltage source to an internal load, the determined difference being equivalent to the external electrical current from the voltage source; and
adjusting the output voltage based on the determined difference that is equivalent to the external electrical current from the voltage source.

* * * * *